(12) United States Patent
Sasaki et al.

(10) Patent No.: US 6,490,414 B2
(45) Date of Patent: Dec. 3, 2002

(54) INSTANT FILM UNIT ADVANCING APPARATUS

(75) Inventors: Hidemi Sasaki, Saitama (JP); Teruaki Koizumi, Saitama (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/984,034

(22) Filed: Oct. 26, 2001

(65) Prior Publication Data

US 2002/0051636 A1 May 2, 2002

(30) Foreign Application Priority Data

Oct. 26, 2000 (JP) ........................................ 2000-326865
Nov. 7, 2000 (JP) ........................................ 2000-339408

(51) Int. Cl.[7] ............................................. G03D 17/50
(52) U.S. Cl. ........................................... 396/36; 396/37
(58) Field of Search ............................. 396/30, 36, 37; 355/27–29

(56) References Cited

U.S. PATENT DOCUMENTS 5,218,391 A * 6/1993 Kanai et al. .................. 396/40
5,794,077 A * 8/1998 Shimizu et al. ............. 396/159

FOREIGN PATENT DOCUMENTS

| DE | 2611603 | * 9/1977 | |
| JP | 7-248553 | 9/1925 | ........... G03B/31/00 |
| JP | 4-194832 | 7/1992 | ........... G03B/17/52 |

* cited by examiner

*Primary Examiner*—Della J Rutledge
(74) *Attorney, Agent, or Firm*—Sughrue Mion, PLLC

(57) ABSTRACT

An instant film unit advancing apparatus of reduced size, which avoids failure of a discharging film unit when a slip arises between a pair of spreading rollers and the film unit. Components to drive and support the pair of rollers and a picking claw for thrusting the film unit to a bite of the pair of rollers are arranged within the width of a film unit pack. Spreading rollers supporting means support a surface of the spreading rollers, and a driving power source unit includes a motor and a reducing gear train whose shafts are parallel to the spreading rollers. A rotating cam shaft moves the picking claw, which is also parallel to the spreading rollers, instead of a large cam plate used in conventional apparatuses. The cam shaft and a featured mechanism keep rotation of the spreading rollers independent from a cam mechanism for moving the picking claw.

16 Claims, 16 Drawing Sheets

F I G. 1 1
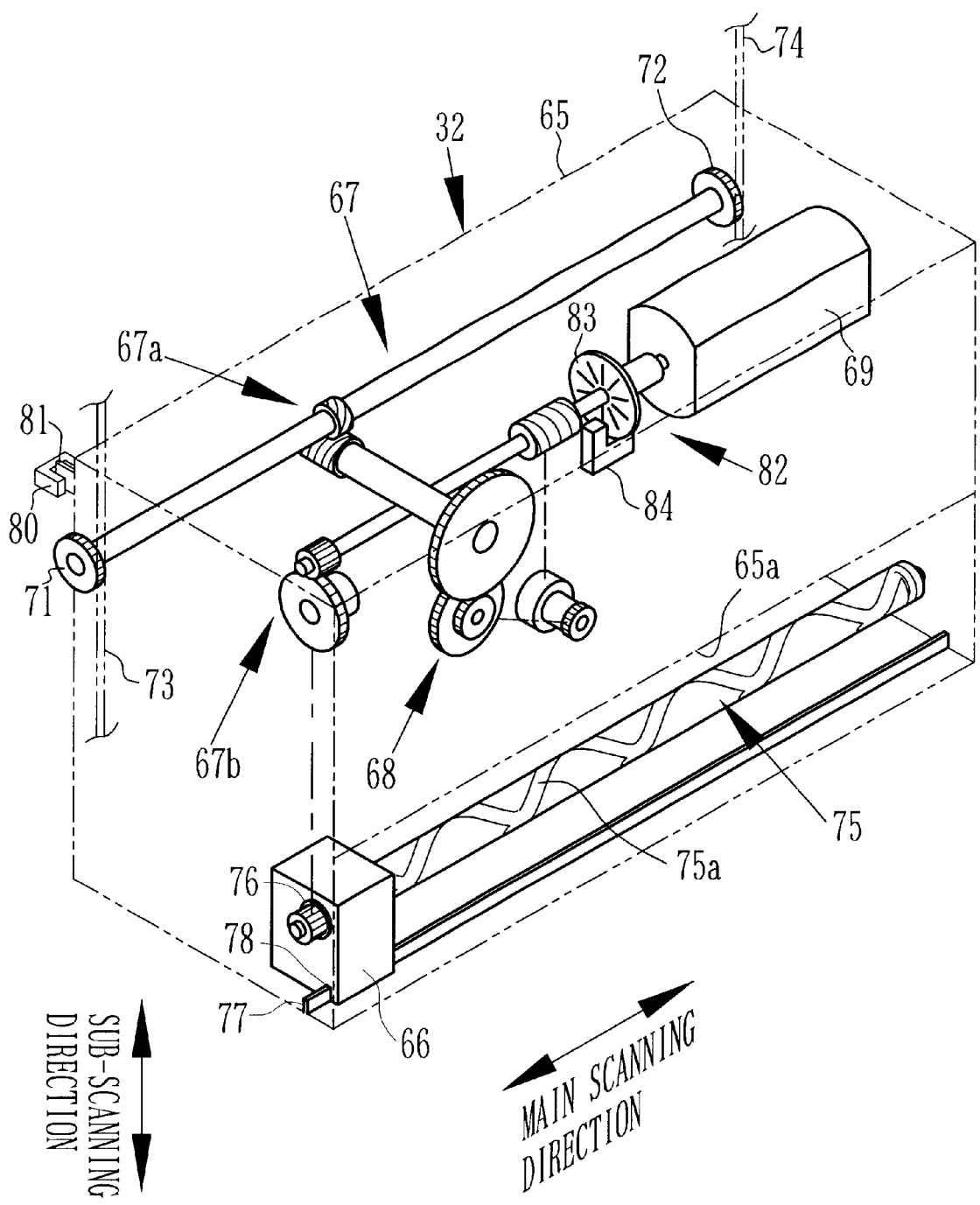

INSTANT FILM UNIT ADVANCING APPARATUS

FIELD OF THE INVENTION

This invention relates to a instant film unit advancing apparatus used for an instant camera or an instant printer to perform a diffusion transfer development while advancing the film unit.

BACKGROUND OF THE INVENTION

Cameras or video printers using a mono-sheet type instant film unit as a recording media are equipped with a film unit advancing apparatus to thrust the film unit out of a film unit pack after exposing the film. The film unit advancing apparatus includes a picking claw to pick the film unit to thrust it out of the film unit pack through an exit slot, a pair of spreading rollers for spreading a developing liquid by pressing the film unit while advancing it to discharge from the camera or video printer and a driving mechanism therefor, which are driven by a common motor. Instant film unit is used for the camera or printer usually in the form of a film pack which holds a plurality of film units arranged in stacked relation therein. The camera or the printer has a film pack loading chamber around which a pair of spreading rollers, driving mechanism therefor and a picking claw driving mechanism are disposed. Japanese laid-open patent application 92/194832 (tokkai-hei 4-194832) shows an instant camera in which a pair of spreading rollers disposed above the film pack loading chamber and a spreading roller driving mechanism and a picking claw driving mechanism are disposed along the side of the chamber.

Japanese laid-open patent application 95/24553 (tokkai-hei 7-248553) shows a picking claw moved by a cam plate to move which is rotated by a common motor to drive a pair of spreading rollers. The picking claw is supported by a slide plate having an integrally formed cam follower. The cam follower engages a periphery of the cam plate so that the picking claw is moved as the cam plate rotates. A predetermined stroke movement of the picking claw thrusts a film unit to a bite of the rotating spreading rollers. Then the film unit is further advanced by the pair of rotating spreading rollers while developing liquid in a container of the film unit is discharged and spread by the roller pressure. Meanwhile, the cam keeps on rotating to return the picking claw to its home position. One cycle of a sequential process that film unit is picked up at its trailing end by the picking claw, thrust out into the bite of a pair of spreading rollers, discharged out of camera and the picking claw is returned to the home position is made by one rotation of the cam plate. Upon detecting the one rotation, the motor is stopped.

This mechanism requires relatively large cam plate because the difference between the largest diameter and the smallest diameter of the cam plate has to match the stroke of the picking claw, which makes it difficult to reduce the size of film unit advancing apparatus. The mechanism also requires an appropriate number of the spreading roller rotation during one rotation of the cam plate so as to discharge the film unit out of the camera or the printer, which may cause failure of discharging film unit if a slip arises between the spreading rollers and the film unit.

The spreading roller has extended small diameter portions (journal portions) both at its end to be supported by bearings, which makes total length of the spreading rollers wider than the width of film pack. This is another cause of making it difficult to reduce the size of camera or printer using an instant film unit.

SUMMARY OF THE INVENTION

An object of the invention is to provide an instant film unit advancing apparatus used in camera or printer of which size is reduced by designing new dispositions of a roller driving mechanism and/or a picking claw mechanism, particularly by improvements in terms of preventing components for the mechanism from being located beyond the width of the film unit pack. Another object of the invention is to provide a compact picking claw mechanism which does not use a large cam plate as in conventional technology to finish one cycle of picking claw sequence, i.e. from starting advancing a film unit by picking an trailing edge thereof through returning to home position. Further object of the invention is to provide a film unit advancing apparatus which can avoid failure of discharging film unit out of camera or printer when a slip arises between spreading rollers and the film unit.

Yet further object of the invention is to provide a method for operating the improved film unit advancing apparatus.

To accomplish those objects, the following each elements is used alone or in combination of some elements for the instant film unit advancing apparatus of the invention.

1. One way transmission device for transmitting rotational force from a motor to a pair of spreading roller only when the motor rotates forwardly and not transmitting when the motor rotates reversely.
2. Keep-positioning means for keeping the picking claw in the same position despite of rotation of the motor.
3. Reciprocating means for reciprocating a picking claw between a home position and an advanced and waiting position, wherein the reciprocating means can return the picking claw from the advanced and waiting position to the home position by making use of reverse rotation of the motor.
4. Each of a pair of spreading rollers is rotatably supported on its surface by roller supporting means.
5. A driving power source unit for driving the pair of spreading rollers and picking claw constituted by the motor and the reducing gear train mounted on a plurality of shaft one of which is connected to a output shaft of the motor, wherein all the shafts of the driving power source unit is arranged parallel to the pair of spreading rollers.
6. The picking claw is slidably mounted behind a rear plate of the base frame which is mounted inside the film unit loading chamber for positioning the film unit pack.
7. Forward and reverse rotation to advance the film unit and return the picking claw is controlled by a timer.

Preferred embodiments of the invention are as follows.

An instant film unit advancing apparatus for advancing a film unit after exposure for developing and discharging outside, comprises a loading chamber for loading a film unit pack; a pair of spreading rollers driven by a motor for developing and advancing an exposed film unit; a picking claw for thrusting the exposed film unit to a bite of the pair of spreading roller (by picking a trailing edge of the exposed film unit); an one way transmission device for transmitting rotational force from the motor to the pair of spreading roller only when the motor rotates forwardly and not transmitting when the motor rotates reversely; and a reciprocating means for reciprocating the picking claw between a home position and an advanced and waiting position, wherein the reciprocating means includes a shifting means for shifting the picking claw between the home position and the advanced and waiting position and a keep-positioning means for keeping the picking claw in the same position despite of rotation of the motor. Preferably the shifting means includes a motor driven cam shaft having a spiral cam groove on the periphery and a interconnecting lever which has a cam follower on one end engaging the spiral cam groove so that the interconnecting lever can swing as the cam shaft rotates to shift the picking claw by a predetermined stroke.

An instant film unit advancing apparatus for advancing a film unit after exposure for developing and discharging outside, comprises a loading chamber for loading a film unit pack; a pair of spreading rollers driven by a motor for developing and advancing an exposed film unit; a picking claw for thrusting the exposed film unit to a bite of the pair of spreading roller (by picking a trailing edge of the exposed film unit); and a reciprocating means for reciprocating the picking claw between a home position and an advanced and waiting position, wherein the reciprocating means can return the picking claw from the advanced and waiting position to the home position by making use of reverse rotation of the motor.

An instant film unit advancing apparatus for advancing a film unit after exposure for developing and discharging outside, comprises a loading chamber for loading a film unit pack; a base frame mounted inside the loading chamber for positioning the film unit pack; a picking claw for thrusting the exposed film unit to a bite of the pair of spreading roller (by picking a trailing edge of the exposed film unit); and a pair of spreading rollers driven by a motor for developing and advancing an exposed film unit, wherein each of the pair of spreading rollers is rotatably supported on its surface by a roller supporting means.

An instant film unit advancing apparatus for advancing a film unit after exposure for developing and discharging outside, comprises a loading chamber for loading a film unit pack; a base frame mounted inside the loading chamber for positioning the film unit pack; a picking claw for thrusting the exposed film unit to a bite of the pair of spreading roller; a pair of spreading rollers for developing and advancing an exposed film unit; and a driving power source unit for driving the pair of spreading rollers and picking claw constituted by the motor and the reducing gear train mounted on a plurality of shaft one of which is connected to a output shaft of the motor, wherein all the shafts of the driving power source unit is arranged parallel to the pair of spreading rollers. Preferably the picking claw is slidably mounted behind a rear plate of the base frame.

An instant film unit advancing apparatus for advancing a film unit after exposure for developing and discharging outside, comprises a loading chamber for loading a film unit pack; a base frame mounted inside the loading chamber for positioning the film unit pack; a picking claw driven by a cam shaft for thrusting the exposed film unit to a bite of a pair of spreading roller; and a driving unit including a driving power source unit, a pair of spreading rollers, intermediate gears for transmitting a rotational force from the driving power source unit to the pair of spreading rollers and the cam shaft, wherein the driving unit is located within a space defined by a top wall of a cassette of the film unit pack where a film unit exit slot is formed and both side plates of the base frame.

A method of advancing an instant film unit for developing and discharging outside, comprises steps of starting a motor rotating forwardly after a film unit is exposed in order to rotate a pair of rollers and a cam shaft to move a picking claw; starting timer system at the same time where a first predetermined time period is set, generating motor-stop signal when the first predetermined time period passes; starting the motor rotating reversely to return the picking claw to home position while keeping stopping the pair of rollers; starting timer system at the same time where a second predetermined time period is set; and generating motor-stop signal when the second predetermined time period passes.

BRIEF DESCRIPTION OF DRAWINGS

FIG. 11 is a exploded perspective view illustrating a mechanical structure for moving a exposure head in both main and sub scanning direction.

DETAILED DESCRIPTION OF THE INVENTION

Figure 1:
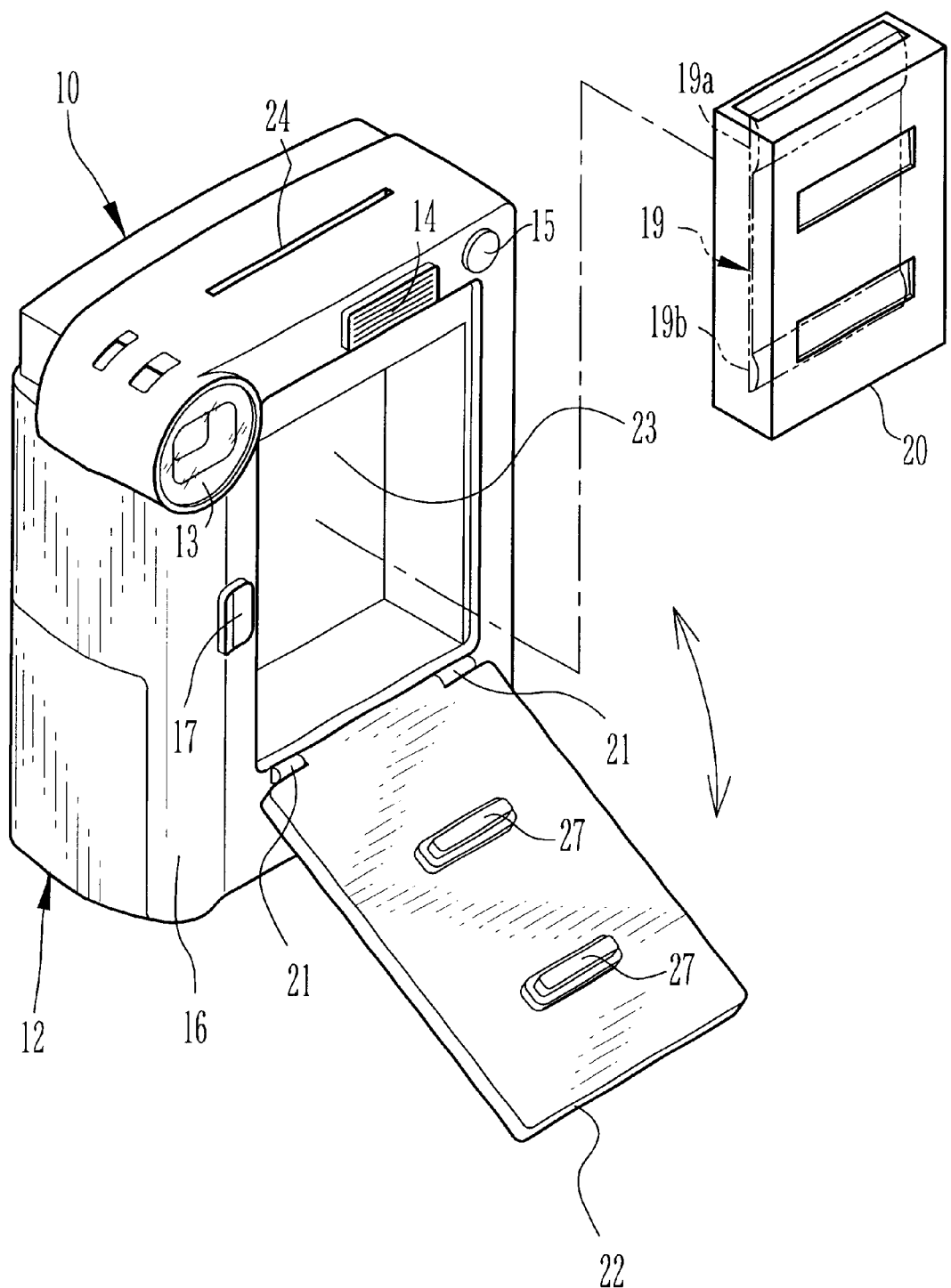
FIG. 1 shows an external perspective view of an electronic still camera with a printer.

FIG. 1 shows an electronic still camera with printer 10 using instant film unit. In the front side of a camera body 12 are disposed a taking lens 13, a flash emitting window 14, a film pack loading lid 22, a loading lid opening button 15 and a shutter release button 17 located on a grip portion 16. A film unit used for the camera with printer 10 is a well-known mono-sheet type instant film unit 19 which is stacked in a cassette of film pack 20. The instant film unit 19 includes a photographic sheet, an image receiving sheet, a pod 19a containing developing liquid therein and a trap 19b disposed opposite end to the pod 19a for trapping excess developing liquid. After the photographic sheet is exposed, the pod 19a is ruptured by a pair of pressing spreading rollers to spread the developing liquid between the photographic sheet and the image receiving sheet to develop the image, and finally a visible image is formed on the image receiving sheet.

The film pack 20 consists of a cassette and film units stacked therein. The film pack 20 is loaded in a film pack loading chamber 23 formed in the front side of the camera. A film pack loading lid 22 hinged 21 to the camera body is used for closing the loading chamber 23. In the top side of the camera body 12 is formed an exit slot 24 through which the film unit 19 is discharged after being exposed in printing operation. A pair of spreading rollers are located behind the exit slot 24 which spreads a developing liquid before discharging the film unit 19 out of the camera body. On the back side of the camera body 12 (not shown) a LCD panel, print start switch and power switch are disposed. The LCD panel is a display monitor to display an image of photographic object through the lens and an image to be printed in printing operation.

Figure 2:
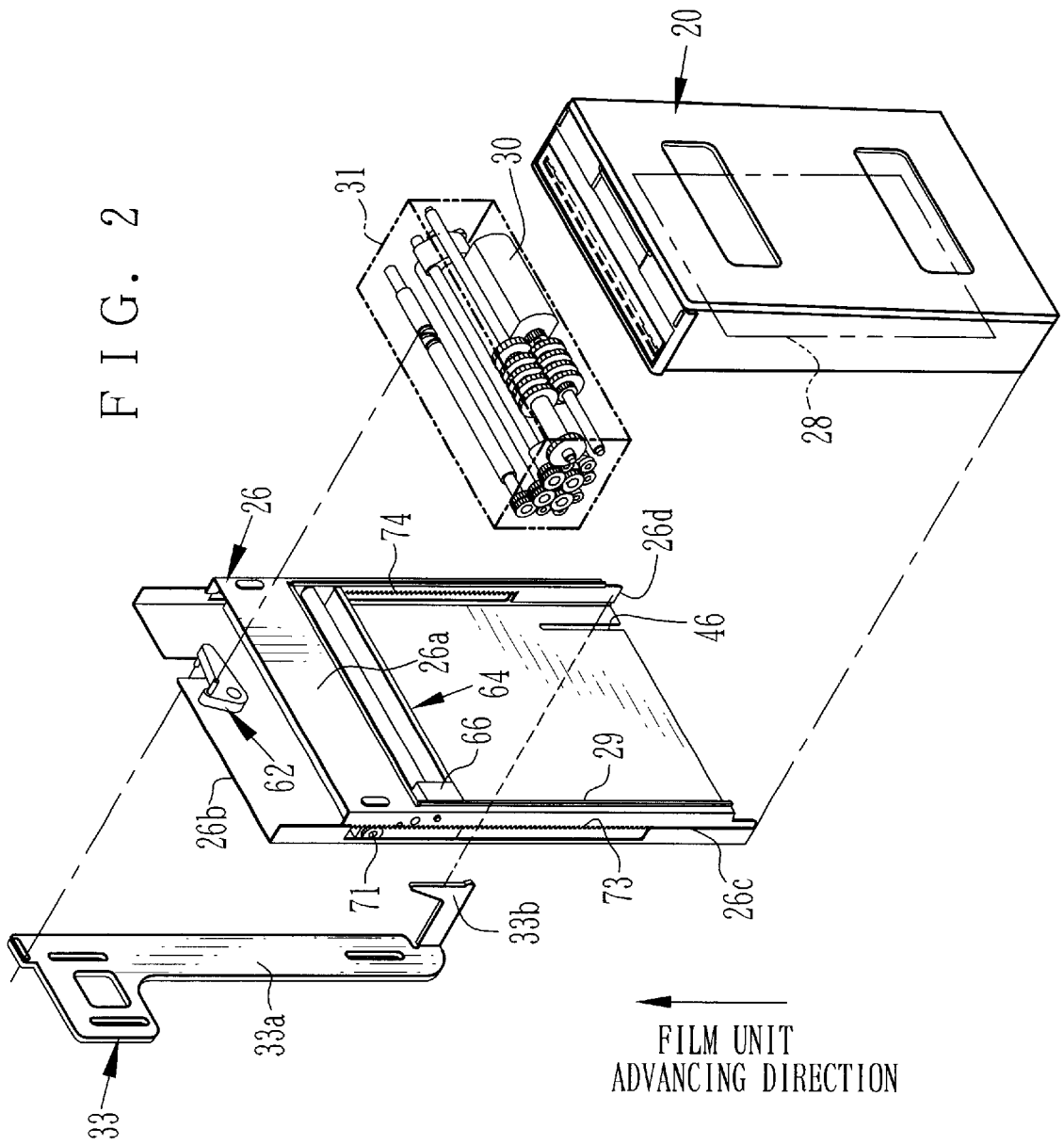
FIG. 2 shows an exploded perspective view illustrating a main portion of a structure inside a film unit pack loading chamber.
Figure 3:
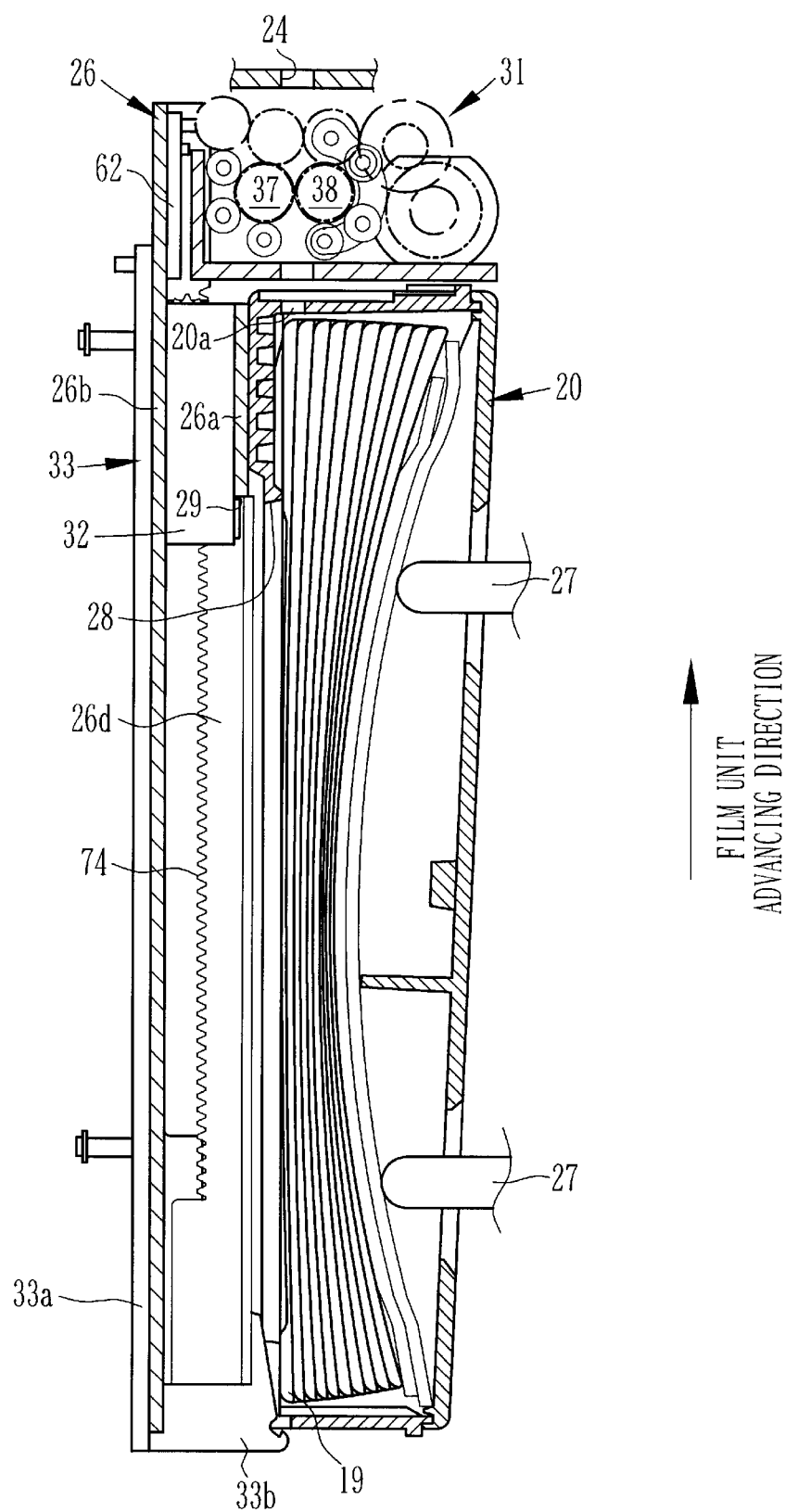
FIG. 3 shows across-sectional view of the film unit pack loading chamber where the pack is loaded.

As shown in FIG. 2 and FIG. 3, a base frame 26 for positioning a film unit pack and for mounting a printing exposure unit is built-in inside the film unit pack loading chamber 23. Loaded film pack 20 is pressed against a front plate 26a of the frame by a pressing member 27 mounted on the back of the loading lid 22. A cassette of the film unit pack has an exposure aperture 28 to define an exposed image area in the front side of the cassette and an film unit exit slot 20a in the top wall of the cassette close to the spreading rollers. The front plate 26a has a front plate opening 29 facing the exposure aperture 28. The front plate opening 29 is large enough to expose whole exposure aperture 29. On the top edge and both side edge forming the front plate opening 29 are formed positioning ribs or positioning projections which fit in positioning members formed on the front side of the cassette of the film pack 20.

A driving unit 31, comprising a motor 30, a roller driving mechanism including gears, a pair of spreading rollers, and a part of a picking claw driving mechanism (a cam shaft), is located immediately above the film unit exit slot 20a of the film unit pack 20 loaded in the loading chamber 23. A base frame 26 includes a front plate 26a, a rear plate 26d, a left side plate 26c and a right side plate 26b which are formed by bending or folding a metal plate. Between the front plate 26a and the rear plate 26d is installed a printing exposure unit 32 which is movable in the film advancing direction when printing. A picking claw 33 as a part of the picking claw driving mechanism is slidably mounted behind the rear plate 26d.

Figure 4:
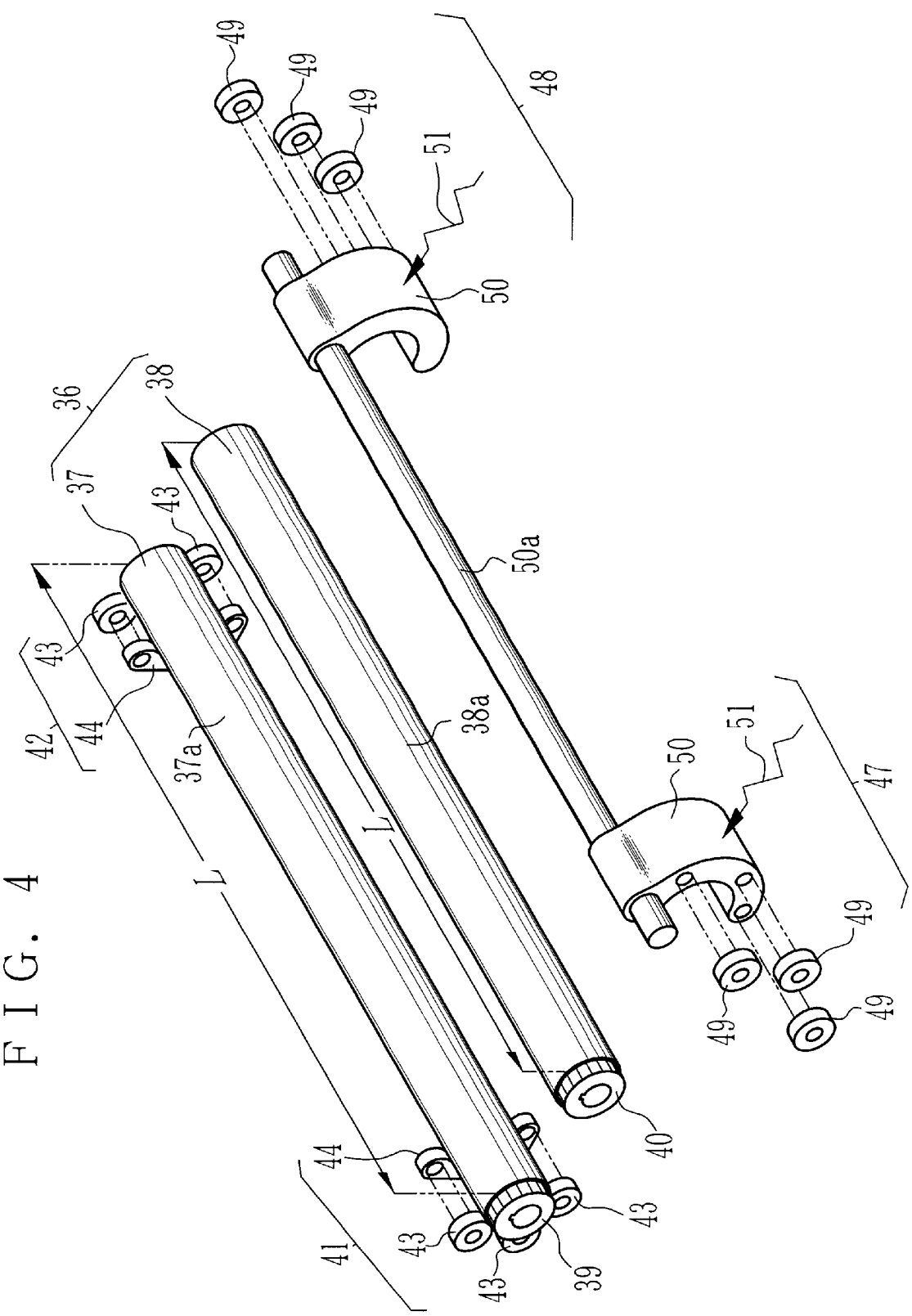
FIG. 4 shows an exploded perspective view of a pair of spreading rollers.

As shown in FIG. 4, A pair of spreading rollers 36 as a part of the roller driving mechanism consists of a fixed roller 36 and a movable roller 38 which pressed against each other. Both the fixed roller 36 and the movable roller 38 have the same radius and roller gears 39 and 40 at their one ends respectively. Both rollers surfaces 37a and 38a have axial lengths L which barely cover a width of the film unit 19. The two roller gears 39 and 40 are away from each other.

The roller surface 37a of the fixed roller 37 is born at both end portions by fixed roller supporting units 41 and 42 each of which consists of a set of three wheels 43 and a wheel holding member 44. Each of the fixed roller supporting unit 41 and 42 secured to the front plate 26a is positioned opposite to the movable roller 38 and the set of three wheels are arranged in arc by the wheel holding member 44 so that three wheels 43 can contact rotating roller surface 37a. Also the roller surface 38a of the movable roller 38 is born at both end portions by movable roller supporting units 47 and 48 each of which consists of a set of three wheels 49. a movable wheel holding member 50 and a spring 51 to urge each of the movable roller supporting units toward the movable roller.

The movable roller supporting units 47 and 48 is positioned opposite to the fixed roller 37 and the set of three wheels are arranged in arc by the movable wheel holding member 50 so that three wheels 49 can contact rotating roller surface 38a. Each set of three wheels 49 and 43 thus contacts, supports and presses the spreading roller surface at the position in the axial direction where the spreading rollers pressure is to be applied to the film unit 19, i.e. within the width of the film unit.

Figure 5:
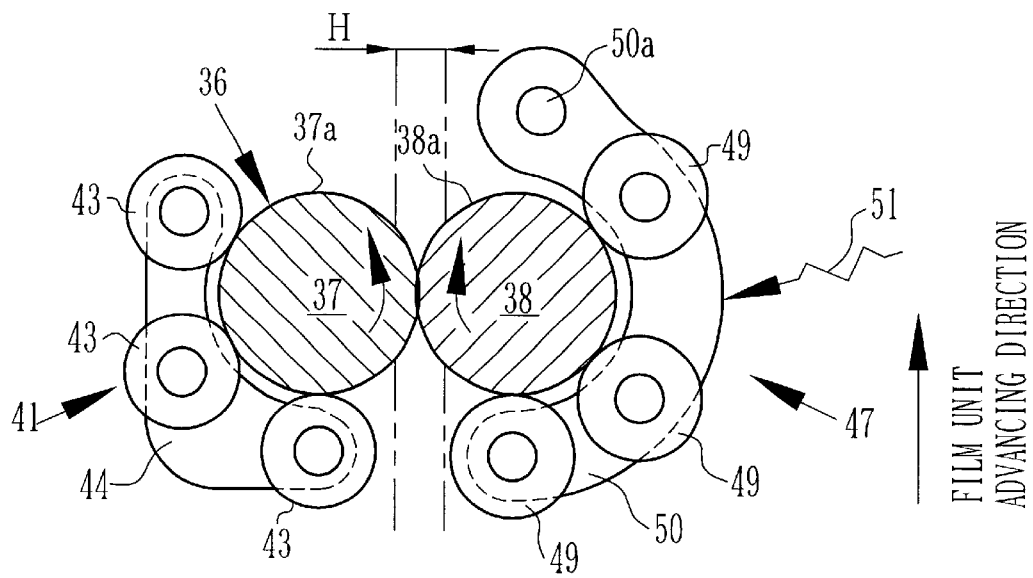
FIG. 5 shows an explanatory diagram illustrating a main portion of a pair of spreading rollers.
Figure 6:
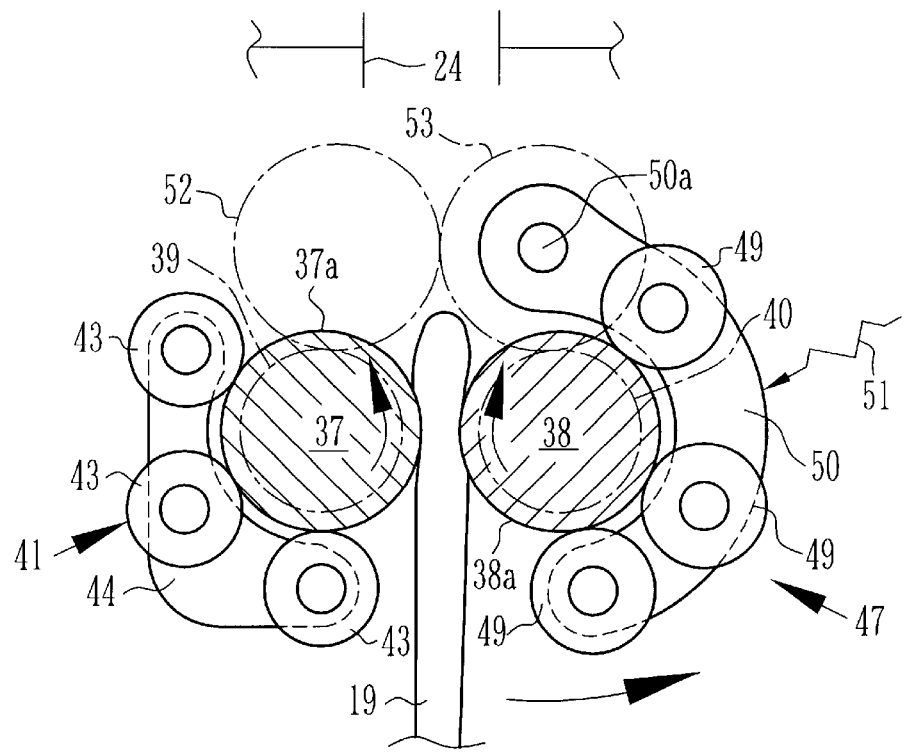
FIG. 6 shows an explanatory diagram illustrating a main portion of a pair of spreading rollers where an film unit is nipped.

As shown in FIG. 5 and FIG. 6, the movable wheel holding member 50 has a wide-U or arc shape in the section open toward the movable roller 38. The movable wheel holding member 50 is pivotally mounted to a wheel holding member supporting shaft 50a at one end portion of the wide-U shape and urged against the movable roller 38 so that the movable roller can be pressed against the fixed roller 37. Each set of three wheels 49 and 43 is arranged so as to approximately face each other via a pair of spreading rollers to be able to resist mutual reaction and so as to be off the film unit advancing path H. As shown in FIG. 6, when the film unit is put into the bite of a pair of rollers, the movable roller 38 slightly rotates counterclockwise about an axis of the wheel holding member supporting shaft 50a to allow the film unit to pass through while being held by the movable roller supporting units 47 and 48.

Figure 7:
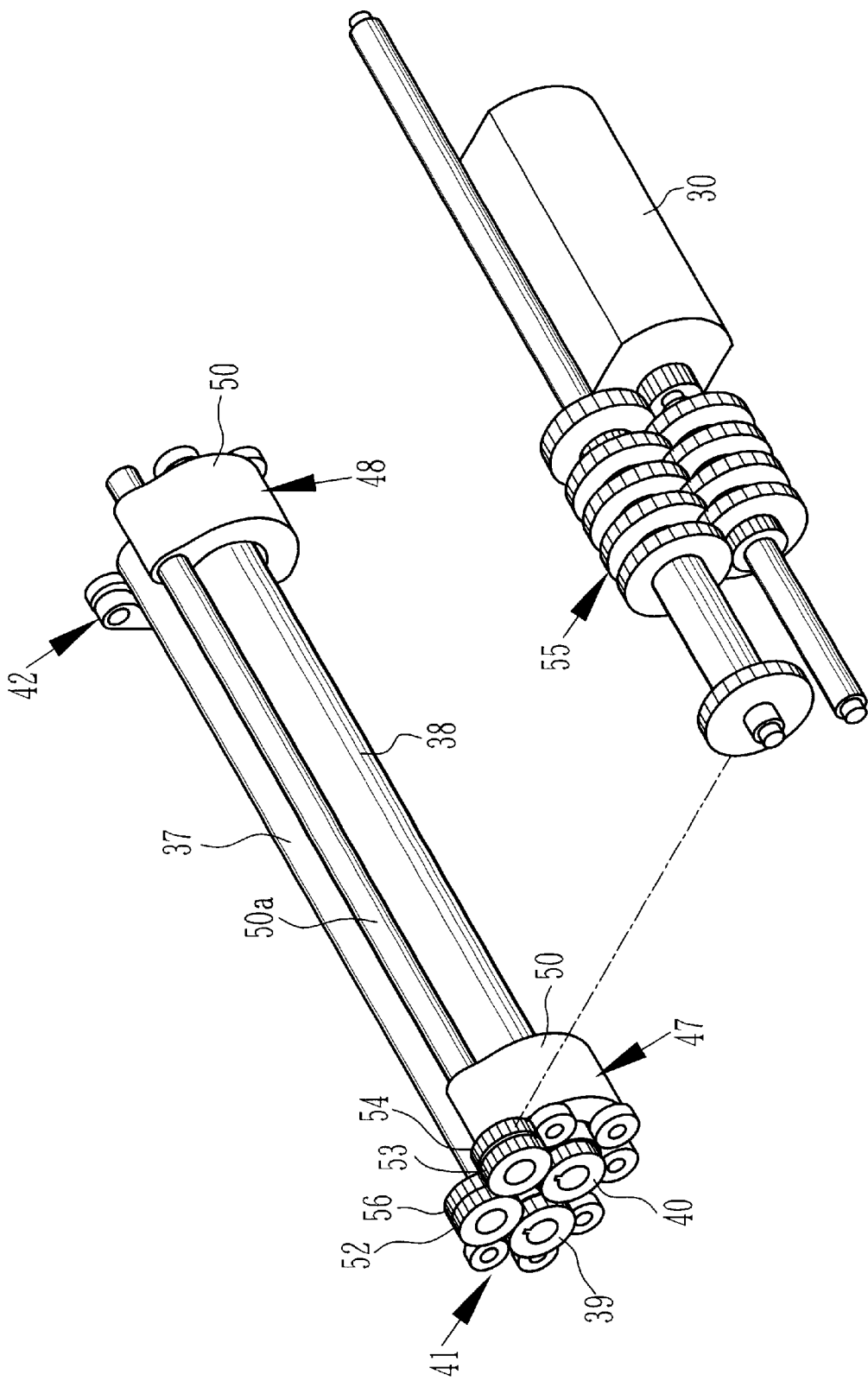
FIG. 7 shows a perspective view of a driving system including driving power source unit for a pair of spreading rollers.

Clutch gears 52 and 53, which mesh with each other, are meshed with the gear 39 fixed to the fixed roller 37 and the gear 40 fixed to the movable roller 38 respectively. As shown in FIG. 7, a clutch gear 53 and the intermediate gear 54 are mounted on the same shaft side by side. The clutch gear 53 has a built-in one way clutch mechanism to transmit only a forward rotation by the motor 30 via a reducing gear train 55 to the shaft of the intermediate gear 54. A reverse rotation of the motor 30 can not be transmitted to the gear 53. Thus a pair of spreading rollers 36 can rotates in the film advancing direction to advance the film unit 19 toward the exit slot 24 only when the forward rotation is transmitted.

The clutch gear 53 is rotatably mounted on the wheel holding member supporting shaft 50a. Therefore the mesh between the clutch gear 53 and the gear 40 which rotates together with the movable roller 38 is always kept when the wheel holding member 50 swings to allow the film unit to pass through or for some other reasons.

Figure 8:
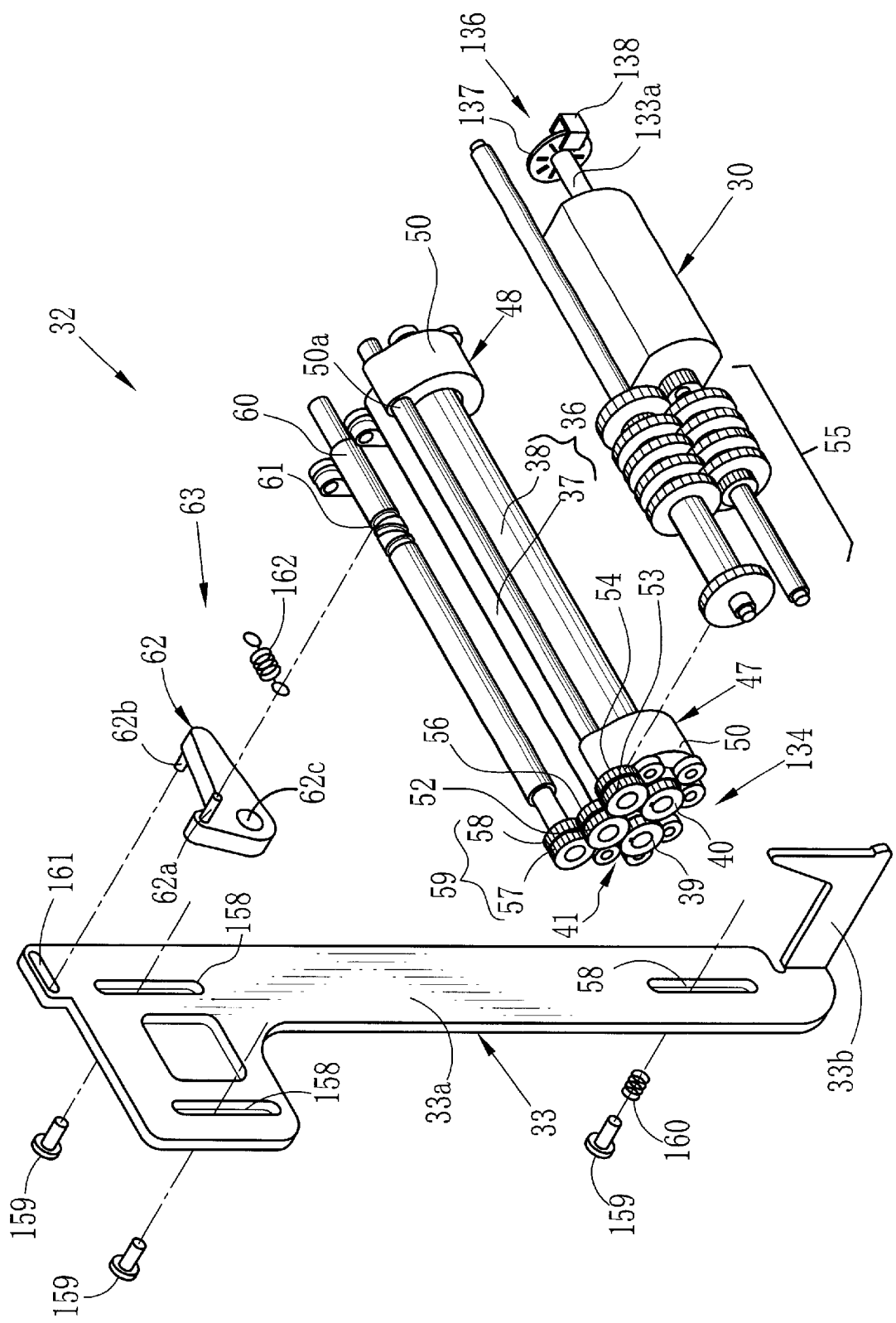
FIG. 8 shows an exploded perspective view of a structure of a film unit advancing apparatus.

FIG. 8 shows the intermediate gear 54 meshes with a gear 56 which meshes with a gear 57. The gear 57 and a slipping gear 58 are mounted on the same shaft side by side to function as a friction clutch 59. When the slipping gear 58 rotates, a cam shaft 60 which has specially designed cam groove 61 is rotated integrally. A cam follower 62a formed in one end portion of a swing lever 62 is engaged with the cam groove 61. The swing lever 62 interconnects the cam shaft 60 and the picking claw member 33 to transform the movement of cam follower 62a into the movement of picking claw member. A picking claw engaging pin 62b formed in the other end is engaged with the picking claw member 33 via a slot formed therein. Thus, when the motor 30 rotates, the cam shaft rotates, which causes the swing lever 62 to swing (about an axis of hole 62c by a movement of the cam pin 62a according to the cam groove 61 and the picking claw is moved by a swing of the engaging pin 62b. Thus the cam shaft 60 and the swing lever 62 constituting a cam mechanism 63 can convert a rotational movement given by the motor 30 into a linear one in the film advancing direction.

As mentioned before, FIG. 8 shows a structure of the film unit advancing apparatus 132 which includes a motor 30, the spreading rollers driving mechanism 34 and the picking claw driving mechanism 63. An rotary encoder 136 is mounted on an output shaft of the motor 30, which consists of a slit disc 137 having a great number of slit in radial direction fixed on the output shaft 133a of the motor 30 and a photo sensor 138. The rotary encoder 136 generates pulse signal the number of which corresponds to the number of slits of the slit disc 137 counted by the photo sensor 138. A magnetic or brush-type rotary encoder can be substituted for the optical one.

When the motor 30 rotates forwardly, the rotation of the motor 30 is transmitted to the spreading roller driving mechanism 134 and the picking claw driving mechanism 63 via the speed reducing mechanism (gear train)55. When the motor 30 rotates reversely, the rotation is not transmitted to the spreading rollers 36 due to one way clutch (explained later) but only to the picking claw mechanism. The spreading roller driving mechanism 134 transmits the rotation of the motor 30 to the spreading rollers 36 via gear train 54, 56, 53, 52, 40 and 39.

Figure 13:
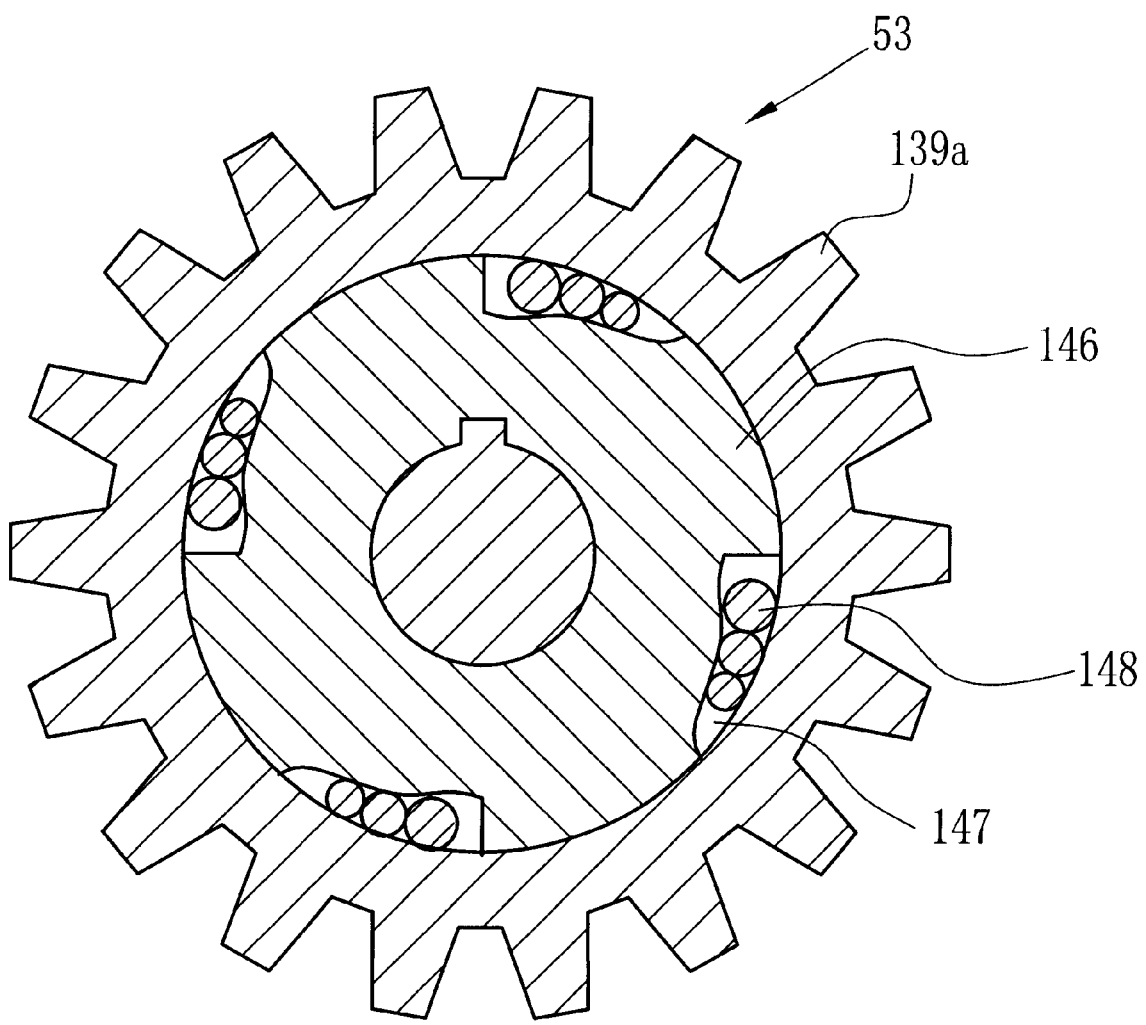
FIG. 13 is a sectional view of a one way clutch.

As shown in FIG. 13, one way clutch gear 53 is constituted by a ring 146 with an engaging recess 147 formed in periphery thereof and an engaging small shaft 148 therein. When the ring 146 rotates counterclockwise in the drawing due to the rotation of the gear 54 adjacent to the clutch gear 53, the engaging small shaft 148 moves toward narrower space in the engaging recess 147 and finally stops relative movement between the inner wall of a ring gear 139a and the recess 147 of the ring 146 by a strengthened friction, which leads to rotation of the ring gear 139a (i.e., rotation of the clutch gear 53) together with the ring 146. Rotation of the gear 53 rotates the spreading roller via gear 40 in the film unit advancing direction.

FIG. 8 shows a picking claw mechanism 35 which includes gears 57 and 58, a cam 61 formed on a cam shaft 60, a swing lever 62 and a picking claw 33. The picking claw member 33 formed by bending a metal plate comprises a claw portion 33b and a bracket portion 33a. The claw portion 33b moves through a slot 46 formed in the rear plate 26b of the base frame 26 and another slot formed in the cassette of the film pack 20 to pick up the trailing edge of the film unit 19. The picking claw member 33 is mounted for sliding movement in the film advancing direction on the back side of the rear plate 26b of the base frame 26 by using mounting pins 159 through three guide slots 158 formed in the bracket portion 33a. The guide slots 158 and the mounting pins 159 functions as guide for the sliding movement. One of the mounting pins near the claw portion 33b wears a coil spring 160 between its head and the bracket portion 33a to bias the bracket portion 33a toward the film pack (more precisely to urge the claw portion 33b against the exposure side of the film unit 19) in order to ensure that the claw portion 33b picks up the trailing edge of the film unit 19. The bracket portion 33a has an engaging slot 161 into which the engaging pin 62b formed on the swing lever 62 is put in.

Figure 14:
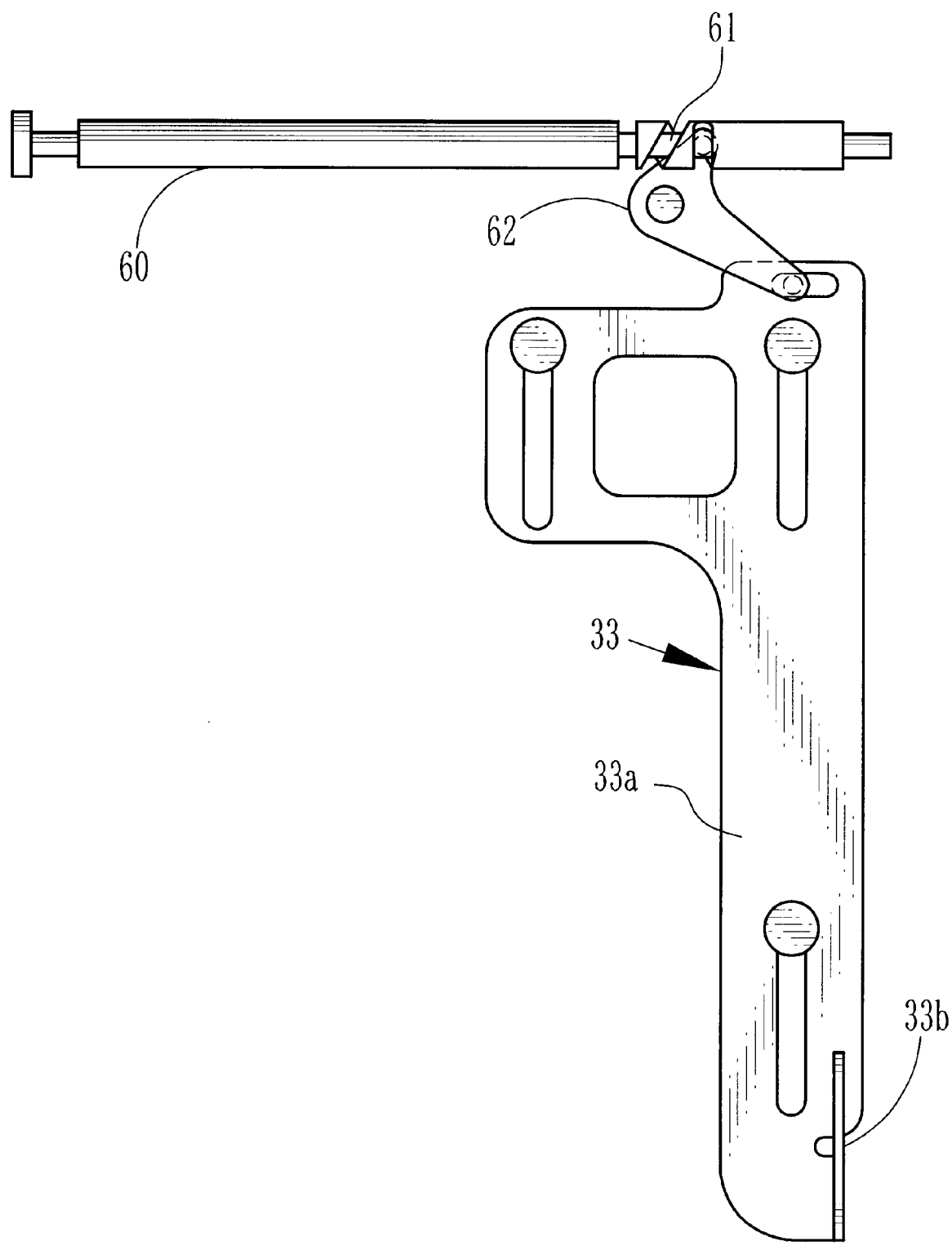
FIG. 14 is an explanatory diagram illustrating a positional relation in a picking claw mechanism when the picking claw is in the home position.
Figure 15:
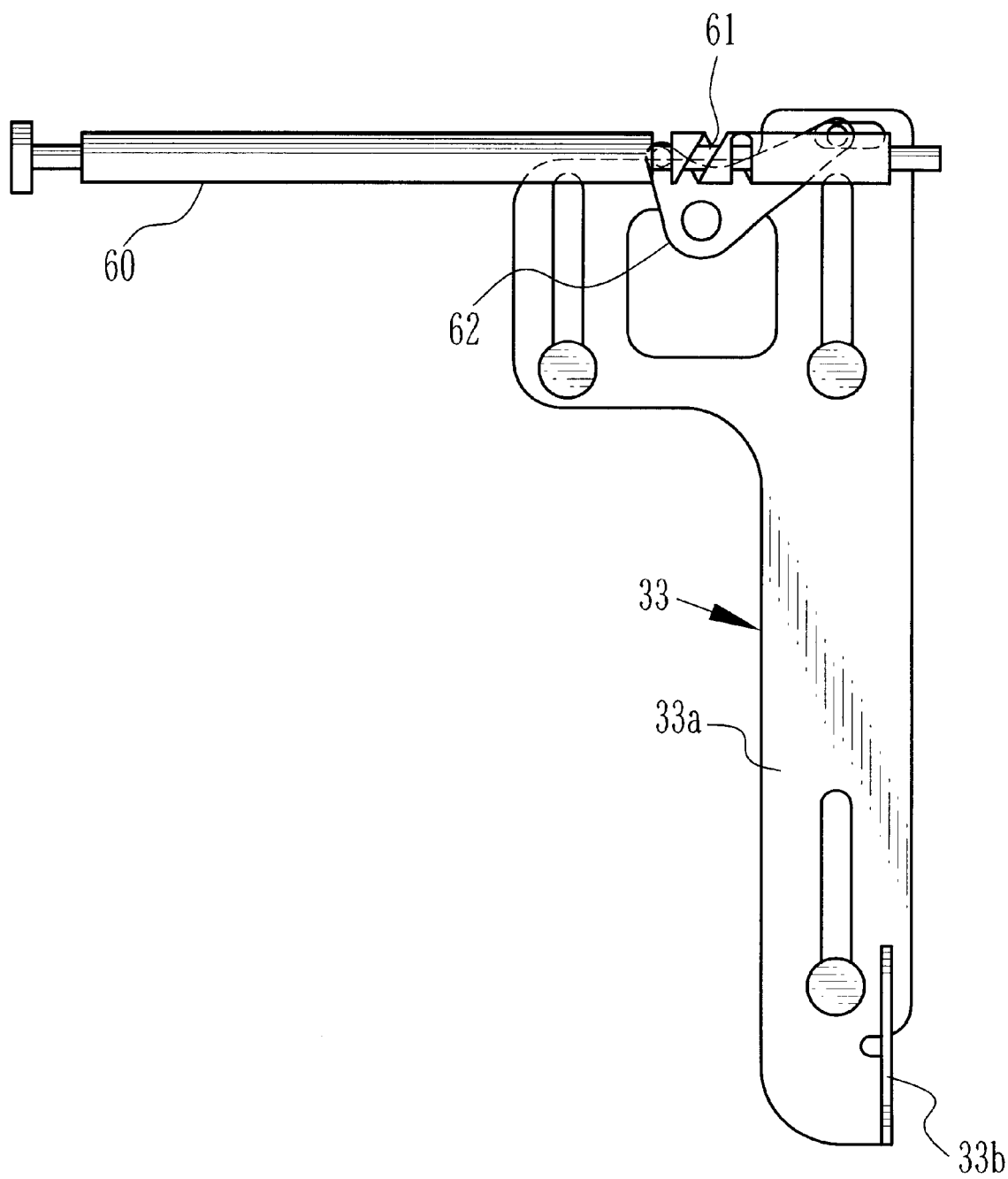
FIG. 15 is an explanatory diagram illustrating a positional relation in a picking claw mechanism when the picking claw is in the advanced and waiting position.

On the base frame 26 for swinging about a hole 62c is mounted the swing (interconnection) lever 62 which makes the picking claw member 33 move back and forth between a home position shown in FIG. 14 and an advanced and waiting position shown in FIG. 15 which predetermined stroke away from the home position. The lever 62 also has a cam follower 62a to engage the cam groove 61. The cam follower 62a is spring-biased toward the right in the drawing by a spring 162. A gear 58 is mounted on one end of a cam shaft 60 which is driven by a gear 57 to which driving force of the motor 30 is transmitted via gear train 55. Thus the cam shaft 60 is driven by the motor 30.

On the periphery of the cam shaft 60 is formed the cam groove 61 which makes the swing lever 62 swing to move the picking claw member 33 back and forth between the home position and the advanced and waiting position. In this embodiment the cam follower 62a is moved by the rotation of the cam groove 61, however FIG. 7 shows a relative position of the cam follower 62a to the cam groove assuming that the cam groove 61 stays still and the cam follower 62a relatively moves. In the drawing, when the motor rotates in the forward direction, i.e. the film unit is to be advanced, the cam follower 62a moves toward the right, and when the motor rotates in the reverse direction, the cam follower 62a moves toward the left. The cam groove 61 consists of a shifting portion 61a and a keep positioning (non-shifting) portion 61b. The shifting portion 61a has a spiral groove which is capable of moving the picking claw member 33 back and forth between the home position and the advanced and waiting position according to the direction of motor rotation.

The keep-positioning portion 61b functions as a stopping cam for keeping a cam follower 62a staying in the same position and consists of a closed loop groove, continued to the end of the shifting portion 61a, formed in the plane perpendicular to the axis of the cam shaft 60. While the motor 30 rotates in the forward direction, the cam follower 62a in the keep-positioning portion 61a can not move into the shifting portion 61a, which keeps the picking claw member 33 staying at the advanced and waiting position. When the motor 30 rotates in the reverse direction, the cam follower 62a moves back to the shifting portion 61a with the help of spring 162 urging the cam follower 62a toward the shifting portion 61a, which makes the picking claw member 33 move back to the home position.

Figure 16:
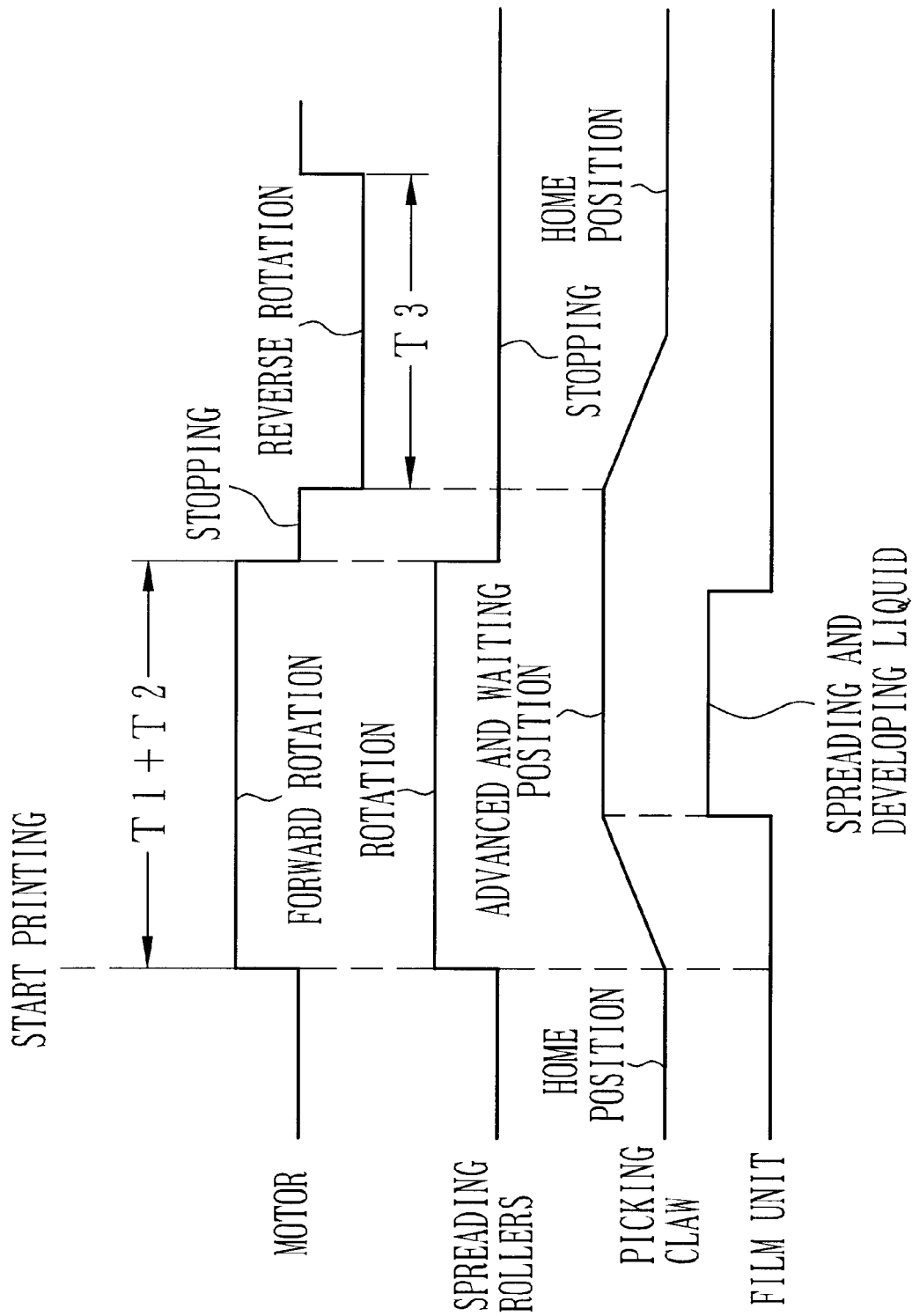
FIG. 16 shows a timing chart illustrating the timing of a motor, a pair of spreading rollers, a picking claw and a film unit in a cycle of operation.

FIG. 16 shows a timing chart indicating sequential actions of the main components of the film advancing apparatus at the film unit advancing stage. When printing the image on the instant film unit starts after photographing through the taking lens, first an exposure unit 64 exposes the film unit 19 and then the motor 30 starts to rotate in the forward direction. The rotation is transmitted to the spreading roller 36 and the cam shaft 60. The rotation of the cam shaft 60 moves the cam follower 62a in the shifting portion 61a, which causes the swing lever 62 to swing so as to shift the picking claw member 33 from home position toward the advanced and waiting position. In this process, the claw portion 33b of the picking claw member 33 picks up the edge of the film unit 19 and advances it toward the spreading rollers 36.

When the picking claw member 33 reaches the advanced and waiting position illustrated in FIG. 15, the cam follower 62a also arrives at the keep-positioning portion 61b, which stops swinging of the swing lever 62. Thus the picking claw member 33 is stopped there. By this point, the film unit 19 reaches the bite of a pair of spreading rollers 36 and the pod 19b of the film unit 19 is ruptured to discharge and spread the developing liquid inside the film unit. As the cam shaft 60 can keep rotating, i.e. a pair of spreading rollers 36 as well as the motor 30 can keep rotating, while the picking claw member is staying at the advanced and waiting position, the film unit 19 is certainly discharged out of the camera with completing spreading the liquid to develop even if the slip arises between the rollers 36 and the film unit 19, which is impossible in the conventional way using one-turn cam plate sequential control.

After completing spreading the developing liquid in the film unit 19, the motor 30 stops and the spreading rollers 36 and other rollers including the cam shaft stop rotating. The time period of motor rotation from starting to stopping is set by a timer so as to have enough time to discharge the film unit 19 out of the pair of rollers 36, which consists of some extra time T2 in addition to normal time T1 to discharge the film unit without any slip. In this embodiment, the time period T1+T2 is stored in memory in advance and when the motor driving time after starting motor rotation, which is calculated by detecting the number of total motor rotation by a rotary encoder 136, reaches T1+T2, the motor 30 is stopped.

Then the motor 30 starts to rotate again in the reverse direction. In this stage, the spreading rollers 36 do not rotate because of the one way clutch 45 and only the cam shaft 60 rotates. Lack of reverse rotation of the spreading rollers 36 can reduce the battery energy consumption and may avoid the invasion of foreign matters stuck on the surface of the rollers into the inside of the camera body 12.

Figure 17:
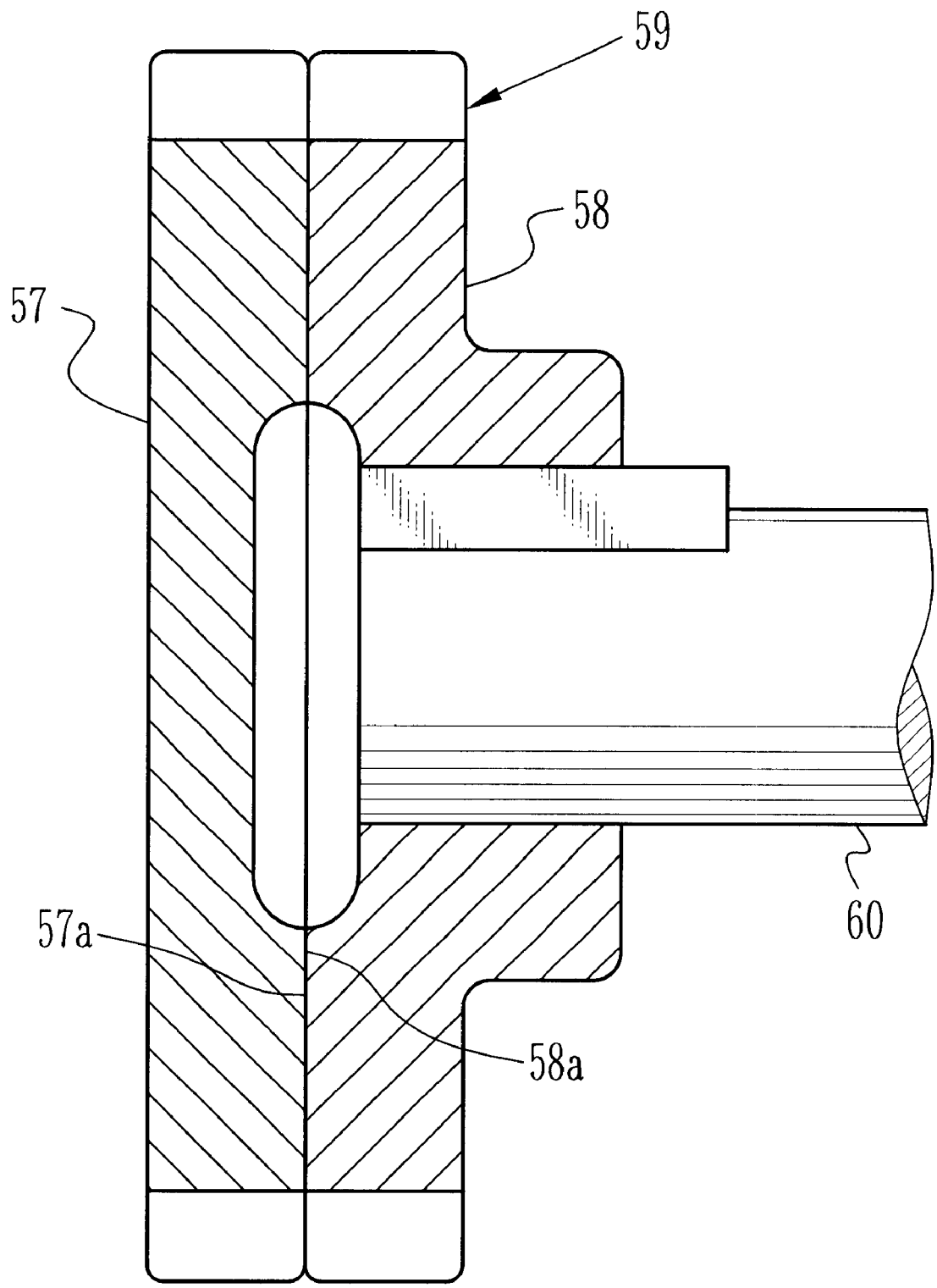
FIG. 17 is a sectional view of a frictional clutch.

As the cam shaft 60 rotates in the reverse direction, the cam follower 62a of the swing lever 62 is shifted back into the shifting portion 61a due to biasing force by the spring 162, which makes the picking claw member 33 move back toward the home position. After the picking claw member 33 arrived at the home position, the motor 30 is stopped. A time period T3 of motor rotation is set by a timer so as to have enough time to return the home position. In this embodiment, when the motor driving time after starting reverse rotation of the motor 30, which is calculated by detecting the number of total motor rotation by a rotary encoder 136, reaches T3, the motor 30 is stopped. When the cam follower 62a reaches dead end of the cam groove which corresponds to the home position of the picking claw member 33 yet before the time T3 does not pass, the cam shaft is forced to stop rotating, but the motor 30 is still rotating. The slipping gear 58 in FIG. 8 and FIG. 17 can absorb the rotating force by slipping to protect the motor from overload.

As the invention explained above uses the cam shaft having the cam groove 61 with keep-positioning portion 61a to be able to keep the picking claw member 33 staying in the advanced and waiting position even while the motor rotates, it is no need to use a large cam plate for one-turn sequential control of shifting the picking claw member 33 in the conventional way, which can reduce the size of the film unit advancing apparatus 132. Also it is avoided that the motor 30 stops in the middle of advancing the film unit.

Figure 9:
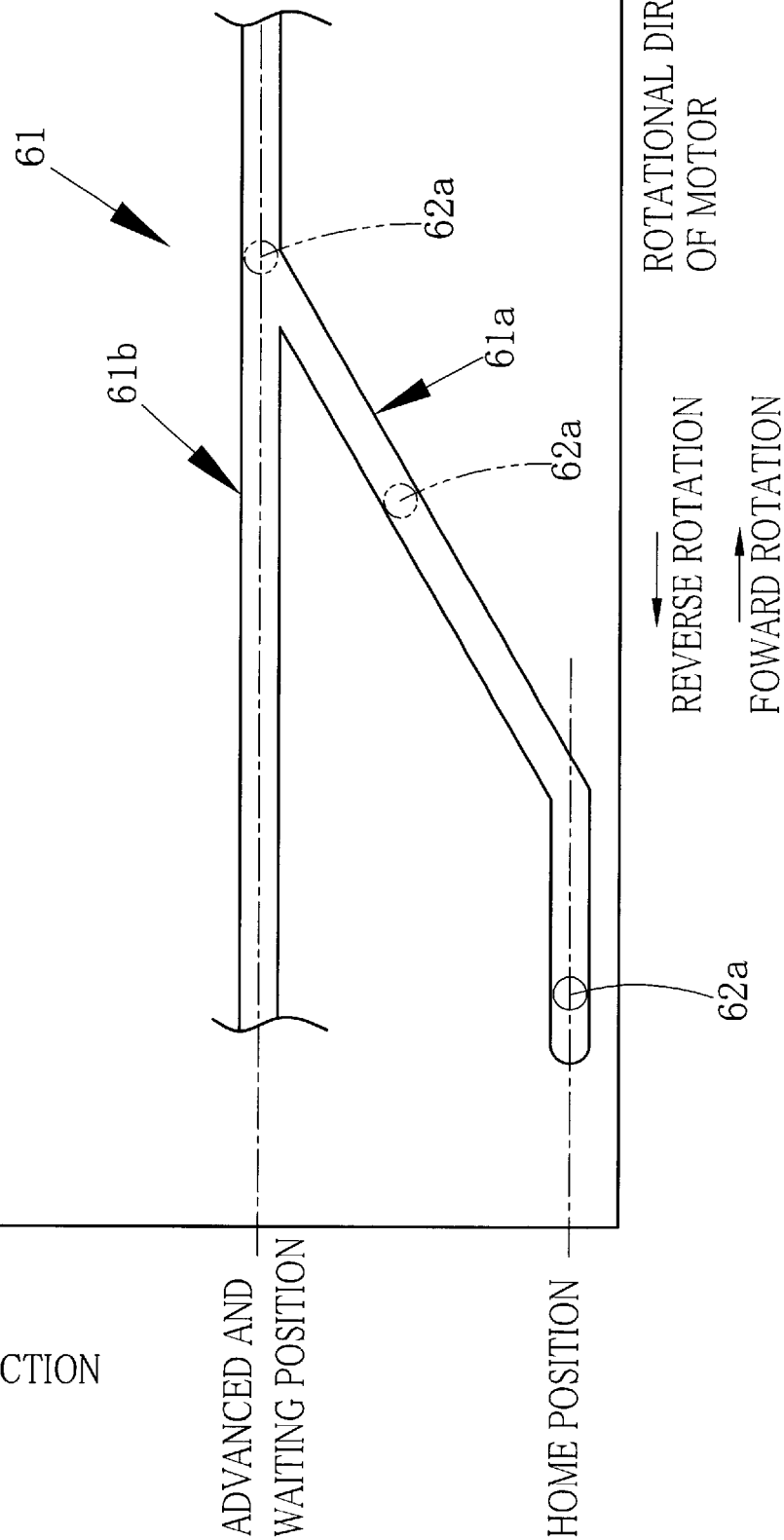
FIG. 9 shows a developed view of a cam groove and movement of a cam follower in association with rotational direction of motor.

In the above embodiment, keep-positioning portion is used for keeping the picking claw member 33 staying the advanced and waiting position. Another way to perform the same function is, for example, to use a friction clutch such as disc clutch which is disposed between the gears 57 and 58. As shown in FIG. 9, a disc clutch 70 consists of a friction surface 57a of the gear 57 and a friction surface 58a of the gear 58 which are urged against each other. The rotation of gear 57 is transmitted to the gear 58 to rotate the cam shaft 60 according to a friction force between the two surfaces. In the case where a dead end cam groove is used instead of the non-shifted portion of closed ring groove, when the cam follower 62a reaches dead end of the cam groove which corresponds to the advanced and waiting position of the picking claw member 33, the cam shaft 60 is forced to stop rotating, but the motor 30 is still rotating. However, as the friction disc clutch 59 can absorb the rotating force by slipping, the picking claw member can stay in the same position without giving an overload to the motor 30 and the cam mechanism. A conical clutch or a drum clutch also can be used as a friction clutch.

On the contrary, the keep-positioning portion of closed ring groove can be used for keeping the picking claw member 33 staying at the home position instead of using a slipping mechanism and the dead end cam groove. In this case, another cam follower shifting mechanism such as a coil spring, which pull the cam follower toward the shifting portion, may be necessary to shift the cam follower 62a into the shifting portion from the keep-positioning portion corresponding to the home position.

How long the motor has been rotating is calculated by detecting the number of total motor rotation by a rotary encoder 136 in the above embodiment. Another ways without measuring time can be used, for example, that the motor is stopped when the completion of discharging the film unit out of the spreading rollers is determined by detecting its trailing end using a photo-sensor. For confirming the picking claw member reaches home position, a photo sensor can be used and upon confirming, reverse rotation of the motor is stopped. A micro-switch also can be substituted for the photo-sensor.

As explained in conjunction with FIG. 7, a spreading roller driving mechanism includes a motor 30, a gear train 55, intermediate gears 52 and 53, and the gears 39 and 40 of the spreading rollers. The picking claw driving mechanism includes the motor 30, the gear train 55 and the clutch gear 54, which are common in the spreading roller driving mechanism, in addition to those, the gears 56 and 57, the slipping gear 58, the cam shaft 60, the swing lever 62 and the picking claw 33 as explained in association with FIG. 8. The components from the motor 30 through the cam shaft 52 are included in the power 31. A driving power source unit is constituted by the motor 30 and the reducing gear train 55 mounted on a plurality of shaft one of which is connected to a output shaft of the motor 30 directly. All the shaft of the driving power source is arranged parallel to the pair of spreading rollers 36 and the entire length of the power source unit is less than the width of the film unit pack 20. The gears, the spreading rollers and other rotating shafts are all disposed so that the rotational axes become perpendicular to the film unit advancing direction. As shown in FIG. 2 and FIG. 3, the pair of spreading rollers and the driving power source unit are supported by a base frame and so closely placed that an output of the driving power unit can be transmitted to the pair of rollers via only one or two intermediate gear.

Figure 10:
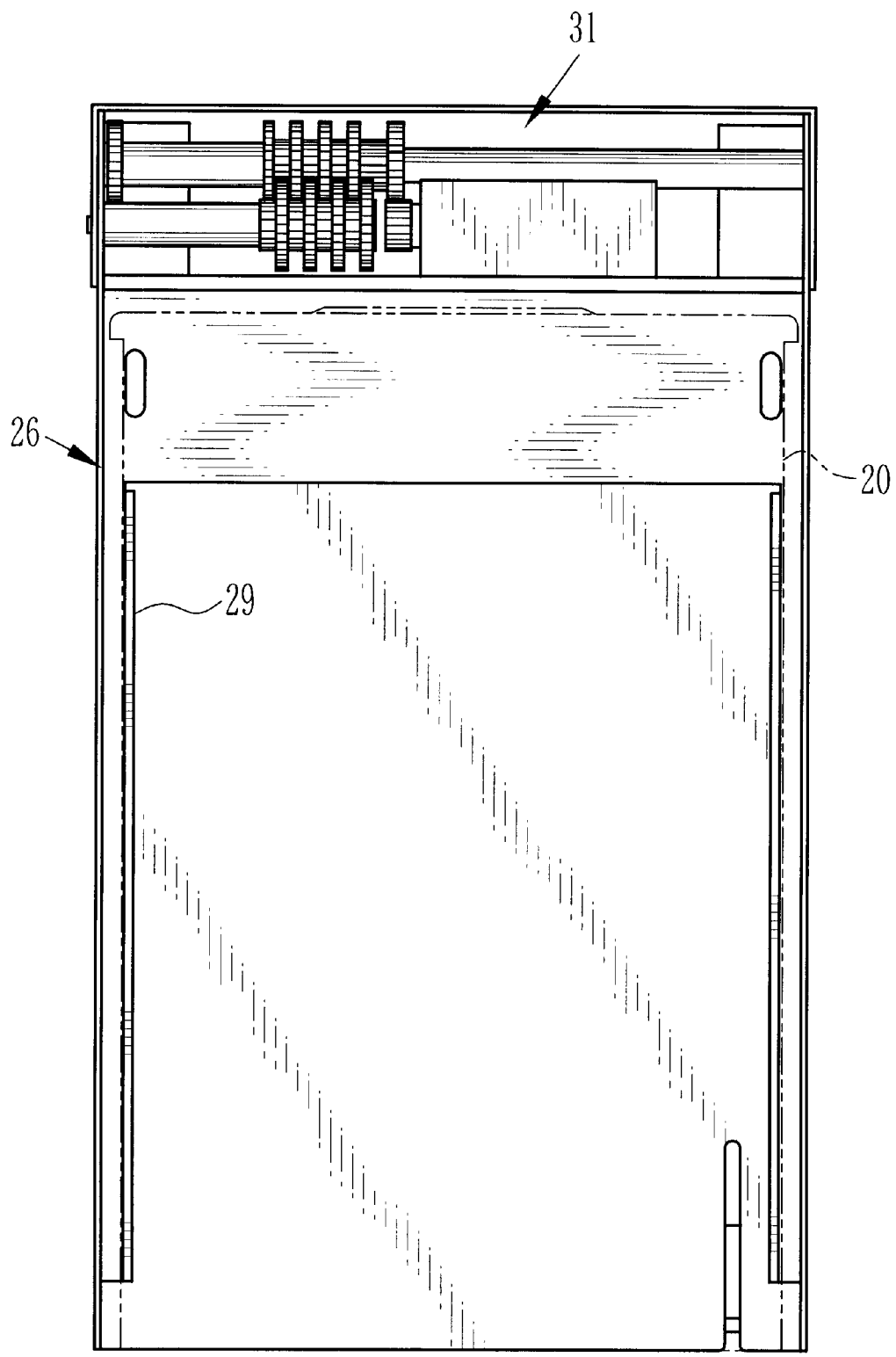
FIG. 10 is a front view in elevation showing layout of a driving unit and a film unit pack.

The surfaces of a pair of spreading rollers 37a and 38a are supported by the fixed roller supporting units 41 and 42 and the movable roller supporting units 47 and 48 at both end portions of the rollers, i.e. within the width of the film unit respectively as explained before, which leads to no need of anything disposed outside the both ends of the spreading rollers except thin gears on one side of each rollers. Thus whole width of the driving unit 31 can be less than inner width of the base frame 26, namely the driving unit 31 can exist within the area of the base frame 26*. Besides the picking claw member 33* is located behind the rear plate 26b of the base frame 26, which leads to no need of anything disposed outside the side plate of the base frame 26. Consequently, the inner width of the base frame 26 can be substantially the same as a width of the film pack 20 as shown in FIG. 10. Nothing to advance the exposed film unit has to be placed outside the base frame area unlike the conventional instant film unit advancing apparatus. This makes it possible to reduce the size of camera or printer using instant film unit according to reduced size of the film pack loading chamber 23.

FIG. 11 shows a printing exposure unit 64, for printing the image recorded by the electronic still camera on the film unit, comprising a exposure head 66 and a head moving mechanism 67 for scanning which are accommodated in a thin rectangular box 65 which has an opening 6 Sa for the light emitted from the exposure head 66. The exposure head 66 has a light emitting portion and an optical image focusing system built-in. The light emitting portion has a set of three minute white light emitting elements which are lined up in the sub-scanning direction (film unit advancing direction) each of which is covered by a R, G or B color filter respectively to emit the light of three colors. The optical image focusing system includes a CELFOC lens ("CELFOC" is the trademark for graded index type optical fiber which functions as a lens due to its refractive index distribution of the second order curve symmetrical about the axis) and a mirror to focus the three color lights emitted by the light emitting elements on the film unit.

The head moving mechanism 67 consists of two mechanisms; a main scanning direction moving mechanism 67b and a sub-scanning direction moving mechanism 67a both of which are driven by a common single motor 69. The main scanning direction moving mechanism 67a moves the head 66 reciprocally in a direction perpendicular to film unit advancing direction and the sub-scanning direction moving mechanism 67a moves the head 66 by one line of forming image per one reciprocal movement of the main moving mechanism 67b.

The sub-scanning direction moving mechanism 67b includes a gear train 68, a pair of s gear 71 and 72 which are exposed outside the box 65, and a pair of racks 73 and 74. (See also FIG. 2) The gear train 68 transmits a reduced rotation of the motor 69 to a pair of pinion gears 71 and 72 which mesh a pair of rack 73 and 74 respectively. A pair of the racks 73 and 74 is formed on the edges of the left side plate 26c and the right side plate 26d in the sub-scanning direction. The box 65 is guided and properly positioned by making use of the rear plate 26b and both side plates 26c and 26d so as to avoid any deviation from the exact sub-scanning direction and backlash to mesh of the pinion and the rack when it moves.

The main scanning direction moving mechanism 67b comprises the gear train 68, a reciprocating cam shaft 75, a bush with cam follower 76 secured to a exposure head 66 and a rotation stopper consisting of a slide rail 77 and a rail receiver 78. The reciprocating cam shaft 75 is disposed parallel to the main scanning direction and rotated by a motor 69 via the gear train 68. A reciprocating cam 75a is formed on the reciprocating shaft 75. The bush with cam follower 76 is fit on the reciprocating cam 75a which is an endless circulating cam capable of reciprocating the exposure head 66 repeatedly in the main scanning direction. The slide rail 77 is placed parallel to the main scanning direction on the bottom of the box 65. The rail receiver 78 formed in a lower portion of the exposure head 66 is slidably received by the slide rail 77.

The exposure head 66 exposes the instant film unit 19 with RGB three colors by one line of the image while traveling from one side(exposure head home position) to the other and shifts by one line in the sub-scanning direction while traveling back to the home position. In such serial printing, it is preferable to install one way clutch somewhere in the drive transmission mechanism, for example, in the middle of gear train, in order to avoid any movements of the exposure head 66 in the main scanning direction when the motor 69 rotates reversely to return the exposure head 66 to the original position for initiating the image printing. At the original position, the exposure head 66 is at its home position (in the main scanning position) and the exposure unit 64 is also at its home position(in the sub scanning direction).

The box 65 is equipped with a photo sensor 80 to detect the home position for the exposure unit 64. The photo sensor 80 generates a stopping signal to stop the motor 69 when detecting a light shielding plate 81 fixed on the rear plate 26d of the base frame 26 to indicate the home position.

An rotary encoder 82 for detecting rotation angle is mounted on an output shaft of the motor 69 consisting of a slit disc 83 fixed on the output shaft of the motor 69 and a photo sensor 84. The rotary encoder 82 generates pulse signal the number of which is corresponds to the number of slits of the slit disc 83 counted by the photo sensor 84. A position of the exposure unit 64 in the sub-scanning direction is determined by counting the number of the pulse.

Figure 12:
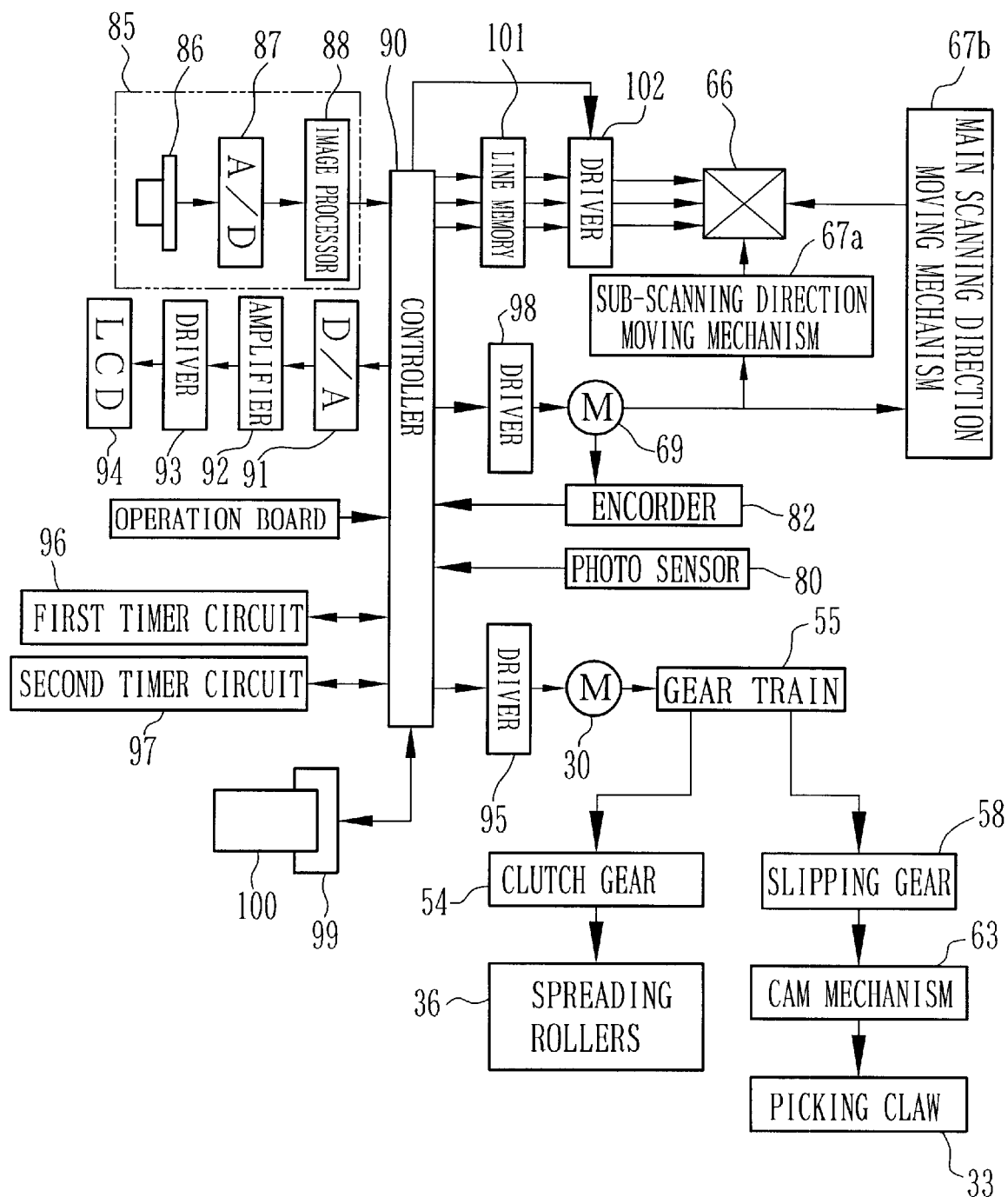
FIG. 12 is a block diagram illustrating a system of an electronic camera with printer using instant film unit.

As shown in FIG. 12, a camera 10 has a photographic section 85 including a CCD image sensor 86, an A/D converter 87 and a image processor 88. A subject image is focused on the CCD image sensor 86 through a taking lens 13, the CCD image sensor transforms the optical image to an electronic image signal. The A/D converter 87 converts the electronic image data to the digital image data which is input into the image processor 88 sequentially which processes the digital image data for adjusting white balance and giving a γ correction.

A controller 90 generates an image signal corresponding to a composite signal based on an image data processed by the image processor 88 to input a driver 93 via a D/A converter 91 and an amplifier 92. The driver 93 drives a LCD panel 94 according to the image signal. Thus the image of the subject can be continuously displayed on the LCD panel 94, which can function as an electronic view finder.

The film unit advancing motor 30 is controlled by a driver 95. The controller 90 actuates a first timer circuit 96 after the exposure by the exposure head 66 to count down according to a predetermined time period T1+T2 for whole instant film unit 19 to emerge from the camera 10, i.e. the trailing edge of the film unit 19 leaves the bite (nip) of the pair of spreading rollers 36, while controlling the driver 95 to keep the motor 30 forwardly driving. When the predetermined time period T1+T2 for the film unit emerging passes, i.e. count-down reaches zero, the controller 90 controls the driver 95 to start the motor 30 reversely while starting to actuate a second timer circuit 97 at the same time to count down according to the predetermined time period T3 for the picking claw member 33 to return to its home position. When the predetermined time period for the picking claw returning passes, the driver 95 stops the motor 30.

The motor 69 for moving the exposure head is controlled by a driver 98 which the controller 90 controls based on a signal output from the photo sensor 80 and the encoder 82. The controller 90 is also connected to a memory card drive 99 to which a memory card 100 is plugged in. Each of image data processed by the image processor 88 is recorded on the memory card. At printing, image data for each colors is read line by line from the memory card 100 to be stored in a line memory 101. A driver 102 drives the exposure head 66 based on the image data stored in the line memory 101. The exposure head 66 controls light intensity of each light emitting elements according to the image data.

Sequential operations and processes of the camera with printer are as follows. First, the film pack loading lid 22 is opened by pressing the loading lid opening button 15 to load the film pack 20 in the film pack loading chamber 23. The exposure aperture 28 of the film pack faces the front plate opening 29 of the base frame 26. When the lid 22 is closed, the film pack 20 is pressed by the pressing member 27 against the base frame 26 so as to be set in a position for printing which is defined by the front plate 26a of the base frame 26.

When photographing, user depresses the shutter releasing button while monitoring the displayed image of the subject on the LCD panel 84. The displayed image on the LCD at the shutter releasing is recorded in the memory card 100.

At printing, the images stored in the memory card 100 are to be displayed on the LCD panel 64. When user selects one of the image on the display panel 64 and turns on a printing switch, the controller 90 makes three colored image data of the selected one be read from the memory card 100 sequentially line by line and transferred to the line memory 101. During this process, the exposure head 66 starts an approach run above (in the sub scanning direction) an actual printing area (photosensitive area of the film unit) and reaches a starting line where the actual exposure for printing is to start after the running speed of the exposure head 66 becomes constant. When the head 66 reaches the starting line is detected by counting the number of pulse signal generated by the encoder 82. When the exposure head 66 reaches the starting line, edge of the printing area, the controller 90 drives the exposure head 66 according to the image data of each colors by controlling the driver 102. While the exposure head 66 moves, the controller 90 controls light emitting time or light intensity of the light emitting element in response to pulse signal from the encoder 82 to avoid unevenness of exposure, such as mottled density and/or color caused by moving speed fluctuation.

The exposure head 66 exposes the instant film unit 19 with RGB three colors by first one line of the image while traveling from one side (exposure headhome position) to the other and shifts by one line in the sub-scanning direction while traveling back to the home position. Before exposing for second line of the image, image data of three colors for second line are transferred from the memory card 100 to the line memory 101 and the second line of the image is printed in the same way as the first line. In this manner, the printer section of the camera 10 forms picture on the instant film unit 19 by serial recording method.

The controller 90 can recognize by counting the number of pulse signal from the encoder 82 that the exposure head 66 reached the last line to be printed and reciprocated to make the last line exposure for the picture. Thus the latent full-color image of the user-selected one is completed on the photosensitive sheet of the film unit 19. Then the controller 90 stops the forward rotation of motor 69.

Alternatively, a line-printing method can be substituted for the serial printing method mentioned above. The line-printing method uses line-type light emitting elements which holds a great number of light emitting elements side by side in line, which does not need to make movement in the main scanning direction as in the serial printing method.

After finishing the exposure printing, the controller 90 returns the exposure head 66 to the original position by switching the rotation direction of the motor 69 from forward direction to reverse one. When the exposure head 66 reaches the original position, the photo-sensor 80 detects the light-shield plate 81 and generates stopping signal for the motor 69. In succession, the controller 90 starts the motor 30 rotating forwardly for advancing and developing the film unit 19 and activates the first timer circuit 96 for count-down the time period for rotating the spreading rollers.

A forward rotation of the motor 30 is transmitted to the pair of spreading rollers 36 via the gear train 55 and the clutch gear 54, which advance the film unit 19 toward the exit slot 24. The gear train 55 also transmits the rotation to the cam mechanism 63 via the slipping gear 58. The cam mechanism 63 shifts the picking claw member 33 from the home position toward the advanced and waiting position by a predetermined stroke by using a rotation of the cam shaft 60 with cam groove and the swing lever 62 swung thereby. At the beginning of the shifting, the claw portion 33b slips into the slot formed in the cassette of the film pack 20 to pick up the trailing edge of the film unit 19 and advance it toward the spreading roller 36. Then the film unit 19 is put into the bite of the pair of spreading roller 36 through the exit slot 20a (See FIG. 3). At this point, the movable roller 38 is pushed up by the edge of film unit 19 and turned together with the movable wheel holding member 50 counterclockwise about an axis 50a shown in FIG. 6 against biasing force of the spring 51 to allow the film unit 19 to pass through. The film unit 19 is further advanced by the pair of spreading rollers 36 toward the exit slot 24 while the pod 19a is ruptured by the nip of the rollers 36 and the developing liquid is being spread between the photosensitive sheet and the image receiving sheet so that the dye-image material is transferred to the receiving sheet to form the image thereon. The excess amount of the developing liquid is accommodated in the trap 19b formed in the trailing end portion of the film unit 19.

After the film unit 19 is discharged out of camera 10 through the exit slot 24, the predetermined time period Tl+T2 set by the first timer circuit 96 elapses, which causes the controller 90 to generate a stopping signal to stop forward rotation of the motor 30. A visible positive color image shows up on the image receiving sheet of the film unit discharged. After stopping the forward rotation, the controller 90 generates a starting signal to start reverse rotation of the motor 30 to return the picking claw member 33 to its home position. Upon starting reverse rotation, the predetermined time period T3 set by the second timer circuit 97 counted down. The reverse rotation of the motor 30 is transmitted to the cam mechanism 63 to move back the picking claw member 33 toward the home position but not transmitted to the spreading roller 36 because of the one way clutch built-in the clutch gear 54.

When the picking claw member 33 reaches home position, the cam follower 62a reaches a dead end 61c of the shifting portion of the cam groove which corresponds to the home position of the picking claw member 55, the cam shaft is forced to stop rotating, but the motor 33 is still rotating. The slipping gear 58 in FIG. 8 can absorb the rotating force by slipping to eliminate overload from the cam mechanism and the motor. Shortly after, count-down of the time period T3 set in the second timer circuit 97 reaches zero, which makes the controller 90 generate a stopping signal to stop the reverse rotation of the motor 30. Thus resetting the picking claw member is completed and the camera become ready to start next printing.

Above described invention of film unit advancing apparatus can be applied not only to an electronic still camera with printer but also to a conventional instant film camera or a printer using an instant film unit. In the instant film unit advancing apparatus of the invention which has a driving unit for advancing exposed film unit and driving a picking claw member, all the components of the driving unit including the motor, the gear train, the spreading rollers and the cam shaft are located within the width of the instant film unit pack 20 and between the top wall of the cassette of the film pack and the top side of the camera or printer where a film unit exit slot is formed and also the picking claw member itself is disposed within the width. Those structures can give the camera a very compact size, specially in its width size. The cam mechanism and the controlling system given by the invention can eliminate use of a large cam plate used in a conventional apparatus and motor stop before discharging the film unit is completed if the slip arises.

What is claimed is:

1. An instant film unit advancing apparatus for advancing a film unit after exposure for developing and discharging outside, comprising:
   a loading chamber for loading a film unit pack;
   a motor configured to rotate forwardly and to rotate reversely;
   a pair of spreading rollers driven by the motor for developing and advancing an exposed film unit;
   a picking claw for thrusting the exposed film unit to a bite of the pair of spreading rollers by picking a trailing edge of the exposed film unit;
   a one way transmission device for transmitting rotational force from the motor to the pair of spreading rollers only when the motor rotates forwardly and not transmitting rotational force from the motor to the pair of spreading rollers when the motor rotates reversely; and
   reciprocating means for reciprocating the picking claw between a home position and an advanced and waiting position, wherein the reciprocating means includes a shifting means for shifting the picking claw between the home position and the advanced and waiting position and a keep-positioning means for keeping the picking claw in the same position in spite of rotation of the motor.

2. An instant film unit advancing apparatus according to claim 1, wherein the keep-positioning means keeps the picking claw in the same position after the picking claw reaches the advanced and waiting position in spite of forward rotation of the motor.

3. An instant film unit advancing apparatus according to claim 1, wherein the keep-positioning means keeps the picking claw in the same position after the picking claw reaches the home position in spite of reverse rotation of the motor.

4. An instant film unit advancing apparatus according to claim 1, wherein the shifting means includes a motor driven cam shaft having a spiral cam groove on the periphery and an interconnecting lever, which has a cam follower on one end engaging the spiral cam groove so that the interconnecting lever can swing as the cam shaft rotates to shift the picking claw by a predetermined stroke.

5. An instant film unit advancing apparatus according to claim 4, wherein the keep-positioning means includes a closed loop groove continued to one end of the spiral cam groove formed in the plane perpendicular to the axis of the cam shaft and the same interconnecting lever.

6. An instant film unit advancing apparatus according to claim 1, 2 or 3, wherein the keep-positioning means includes a clutch for preventing a rotational force from being transmitted to the shifting means when the shifting means is overloaded due to the picking claw's reaching the advanced and waiting position or the home position.

7. An instant film unit advancing apparatus for advancing a film unit after exposure for developing and discharging outside, comprising:
   a loading chamber for loading a film unit pack;
   a motor configured to rotate forwardly and to rotate reversely;
   a pair of spreading rollers driven by the motor for developing and advancing an exposed film unit;
   a picking claw for thrusting the exposed film unit to a bite of the pair of spreading rollers by picking a trailing edge of the exposed film unit;
   a one way transmission device for transmitting rotational force from the motor to the pair of spreading rollers only when the motor rotates forwardly and not transmitting rotational force from the motor to the pair of spreading rollers when the motor rotates reversely; and
   reciprocating means for reciprocating the picking claw between a home position and an advanced and waiting position, wherein the reciprocating means can return the picking claw from the advanced and waiting position to the home position by making use of reverse rotation of the motor.

8. An instant film unit advancing apparatus according to claim 7, wherein the reciprocating means includes a shifting means constituted by a cam shaft having a spiral cam groove on the periphery and an interconnecting lever which has a cam follower on one end engaging the spiral cam groove so that the interconnecting lever can swing as the cam shaft rotates to shift the picking claw by a predetermined stroke.

9. An instant film unit advancing apparatus, comprising:
   first and second spreading rollers driven by a motor for developing and advancing an exposed film unit;
   a pair of fixed holding members located at both sides of said first spreading roller;
   a first plurality of wheels rotatably attached to said pair of fixed holding members and disposed so as to form an arc-shaped form for rotatably receiving said first spreading roller;
   a pair of movable holding members located at both sides of said second spreading roller, each of said movable holding members being swingable around an edge;
   a second plurality of wheels rotatably attached to said pair of movable holding members and disposed so as to form an arc-shaped form for rotabably receiving said second spreading roller; and
   a biasing device for biasing at least one of said pair of movable holding members such that said second spreading roller contacts said first spreading roller.

10. An instant film unit advancing apparatus for advancing a film unit after exposure for developing and discharging outside, comprising:
    a loading chamber for loading a film unit pack;
    a base frame mounted inside the loading chamber for positioning the film unit pack;
    a pair of spreading rollers for developing and advancing an exposed film unit;
    a picking claw for thrusting the exposed film unit to a bite of the pair of spreading rollers by picking a trailing edge of the exposed film unit; and
    a driving power source unit for driving the pair of spreading rollers and the picking claw constituted by a motor and a reducing gear train mounted on a plurality of shafts, one of which is connected to an output shaft of the motor, wherein all the shafts of the driving power source unit are arranged parallel to the pair of spreading rollers.

11. An instant film unit advancing apparatus according to claim 10, wherein a pair of spreading rollers and the driving power source unit are closely placed and supported by the base frame.

12. An instant film unit advancing apparatus according to claim 9, 10 or 11, wherein the picking claw is slidably mounted behind a rear plate of the base frame.

13. An instant film unit advancing apparatus according to claim 9, 10 or 11, further comprising a printing exposure unit supported by the base frame which has an RGB three-color light emitting head to expose a photosensitive sheet of the film unit line by line through an exposure aperture of the film unit pack.

14. An instant film unit advancing apparatus according to claim 13, wherein the printing exposure unit is supported by a guide formed on the base frame for movement in the film advancing direction.

15. An instant film unit advancing apparatus for advancing a film unit after exposure for developing and discharging outside, comprising:

a loading chamber for loading a film unit pack;

a base frame mounted inside the loading chamber for positioning the film unit pack;

a picking claw driven by a cam shaft for thrusting the exposed film unit to a bite of a pair of spreading roller; and a driving unit including a driving power source unit, a pair of spreading rollers, intermediate gears for transmitting a rotational force from the driving power source unit to the pair of spreading rollers and the cam shaft, wherein the driving unit is located within a space defined by a top wall of a cassette of the film unit pack where an film unit exit slot is formed and both side plates of the base frame.

16. A method of advancing an instant film unit for developing and discharging outside, comprising the steps of:

starting a motor rotating forwardly after a film unit is exposed in order to rotate a pair of rollers and a cam shaft to move a picking claw;

starting a timer system at the same time where a first predetermined time period is set;

generating a motor-stop signal when the first predetermined time period passes;

starting the motor rotating reversely to return the picking claw to a home position while preventing the pair of rollers from rotating;

starting the timer system at the same time where a second predetermined time period is set; and generating the motor-stop signal when the second predetermined time period passes.

* * * * *